United States Patent
Qu et al.

(10) Patent No.: US 12,413,365 B2
(45) Date of Patent: Sep. 9, 2025

(54) COMMUNICATION METHOD AND APPARATUS

(71) Applicant: HUAWEI TECHNOLOGIES CO., LTD., Guangdong (CN)

(72) Inventors: Weilin Qu, Beijing (CN); Liyan Su, Beijing (CN); Jingjing Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 398 days.

(21) Appl. No.: 18/167,161

(22) Filed: Feb. 10, 2023

(65) Prior Publication Data

US 2023/0188294 A1 Jun. 15, 2023

Related U.S. Application Data

(63) Continuation of application No. PCT/CN2021/107073, filed on Jul. 19, 2021.

(30) Foreign Application Priority Data

Aug. 13, 2020 (CN) .......................... 202010814990.8

(51) Int. Cl.
*H04L 5/00* (2006.01)
*H04J 11/00* (2006.01)
(Continued)

(52) U.S. Cl.
CPC .......... *H04L 5/0051* (2013.01); *H04J 11/005* (2013.01); *H04L 5/0053* (2013.01);
(Continued)

(58) Field of Classification Search
CPC ..... H04J 11/005; H04J 13/004; H04L 5/0051; H04L 5/0053; H04L 5/0094; H04W 72/23
See application file for complete search history.

(56) References Cited

U.S. PATENT DOCUMENTS

| | | | | |
|---|---|---|---|---|
| 2011/0194495 A1* | 8/2011 | Seo | ........................ | H04W 16/12 370/328 |
| 2014/0071848 A1* | 3/2014 | Park | ...................... | H04L 5/0073 370/252 |

(Continued)

FOREIGN PATENT DOCUMENTS

| | | | |
|---|---|---|---|
| CN | 109728888 A | * | 5/2019 |
| CN | 111416692 A | | 7/2020 |

(Continued)

OTHER PUBLICATIONS

Huawei, HiSilicon, Sidelink physical layer structure for NR V2X. 3GPP TSG RAN WG1 Meeting #99, Reno, USA, Nov. 18-22, 2019, R1-1911882, 35 pages.

(Continued)

*Primary Examiner* — Shah M Rahman

(57) ABSTRACT

This application provides a communication method and apparatus, so that a first network device can configure a terminal device to send a demodulation reference signal symbol in a first different-configuration slot. A quantity of consecutive resource elements occupied by each demodulation reference signal code division multiplexing group included in a demodulation reference signal symbol is greater than 2. Therefore, a quantity of demodulation reference signal ports supported by each demodulation reference signal code division multiplexing group is greater than 2, so that an uplink communication capacity of the terminal in the different-configuration slot can be increased when a quantity of demodulation reference signal code division multiplexing groups in each demodulation reference signal symbol remains unchanged, to meet an uplink transmission requirement of the terminal device.

20 Claims, 8 Drawing Sheets

(51) Int. Cl.
*H04W 72/0446* (2023.01)
*H04W 72/23* (2023.01)

(52) U.S. Cl.
CPC ....... *H04L 5/0094* (2013.01); *H04W 72/0446* (2013.01); *H04W 72/23* (2023.01)

(56) References Cited

U.S. PATENT DOCUMENTS

| | | | | |
|---|---|---|---|---|
| 2014/0105158 | A1* | 4/2014 | Kim | H04L 1/0038 370/329 |
| 2015/0181558 | A1* | 6/2015 | Yang | H04W 72/30 370/312 |
| 2016/0352447 | A1* | 12/2016 | Koutsimanis | H04W 24/02 |
| 2018/0316534 | A1* | 11/2018 | Shin | H04L 5/0051 |
| 2019/0386801 | A1* | 12/2019 | Ren | H04L 5/0048 |
| 2020/0266964 | A1* | 8/2020 | Kang | H04W 72/23 |
| 2021/0212040 | A1* | 7/2021 | Ge | H04L 5/0051 |

FOREIGN PATENT DOCUMENTS

| | | |
|---|---|---|
| WO | 2019024711 A1 | 2/2019 |
| WO | 2019072077 A1 | 4/2019 |

OTHER PUBLICATIONS

3GPP TS 38.211 V16.2.0 (Jun. 2020), 3rd Generation Partnership Project; Technical Specification Group Radio Access Network; NR; Physical channels and modulation(Release 16), 131 pages.
International Search Report and Written Opinion issued in PCT/CN2021/107073, dated Oct. 22, 2021, 9 pages.

* cited by examiner

COMMUNICATION METHOD AND APPARATUS

CROSS-REFERENCE TO RELATED APPLICATIONS

This application is a continuation of International Application No. PCT/CN2021/107073, filed on Jul. 19, 2021, which claims priority to Chinese Patent Application No. 202010814990.8, filed on Aug. 13, 2020. The disclosures of the aforementioned applications are hereby incorporated by reference in their entireties.

TECHNICAL FIELD

The present disclosure relates to the field of mobile communication technologies, and in particular, to a communication method and apparatus.

BACKGROUND

In a 5th generation (5G) wireless communication system-new radio (NR) system, information exchanged between a terminal device (user equipment, UE) and a base station ((next) generation NodeB, gNB) is carried on a physical channel. Data sent by the base station, namely, downlink (DL) data, is usually carried on a physical downlink shared channel (PDSCH). Control information sent by the base station, namely, downlink control information, is usually carried on a physical downlink control channel (PDCCH). Data sent by the UE, namely, uplink (UL) data, is usually sent on a physical uplink shared channel (PUSCH).

NR supports time division duplex (TDD). A network device may alternately configure an uplink slot and a downlink slot on a same carrier to implement the TDD. A ratio of the uplink slot to the downlink slot in time domain is referred to as a TDD uplink-downlink configuration. A scenario in which a macro cell and a micro cell coexist is used as an example. If a macro site serving the macro cell uses a conventional uplink-downlink slot configuration with more downlink slots and fewer uplink slots, and a micro site uses an uplink-downlink slot configuration with more uplink slots and fewer downlink slots, a same slot may serve as a downlink slot for the macro site, and serve as an uplink slot for the micro site. In this case, such a slot may be referred to as a macro-micro different-configuration slot (a different-configuration slot for short). During data transmission, the macro site sends data in a different-configuration slot, and UE served by the micro site also sends uplink data to the micro site in the slot. Therefore, the data sent by the macro site in the different-configuration slot is exactly received by the micro site that is ready to receive the uplink data from the UE served by the micro site. This causes neighboring cell interference.

To reduce impact of the neighboring cell interference, the micro site needs to configure the UE to include a demodulation reference signal (DMRS) in an uplink PUSCH, obtain an interference covariance matrix through measurement based on the DMRS sent by the UE, and suppress the interference by using a Wiener filtering algorithm based on the interference covariance matrix. Currently, when the micro site configures a single-symbol DMRS for the UE, uplink transmission of the UE can support a maximum of six DMRS ports, to be specific, support transmission of a maximum of six data streams. Consequently, an uplink data transmission capacity is low, and cannot meet an uplink transmission requirement of the UE served by the micro site.

SUMMARY

The present disclosure provides a communication method and apparatus, to increase an uplink transmission capacity that is of UE served by a micro site and that is in a different-configuration slot.

The present disclosure provides the communication method, to improve a peak throughput over an air interface.

According to a first aspect, an embodiment of the present disclosure provides a communication method. The method may be performed by a terminal device or a component (for example, a processor, a chip, or a chip system) in the terminal device.

The following provides descriptions by using an example in which the method is performed by the terminal device. According to the method, the terminal device may receive first information, second information, third information, and fourth information from a first network device. The first information may indicate a position of a time-frequency resource occupied by a PDCCH control resource set (CORESET) of a second network device. The second information indicates that each DMRS code division multiplexing (CDM) group included in a DMRS symbol occupies n resource elements (REs) consecutive in frequency domain, where n is a positive integer and is greater than 2. The third information may indicate a symbol position of the DMRS symbol in a different-configuration slot. The fourth information indicates a time domain position of at least one different-configuration slot.

The first network device is located within coverage of the second network device. The terminal device may further receive uplink grant information from the first network device. The uplink grant information indicates a position of a time-frequency resource for uplink data of the terminal device.

The terminal device may send the DMRS symbol to the first network device in a first different-configuration slot based on the second information and the third information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

According to the foregoing method, the first network device may configure the terminal device to send the DMRS symbol in the first different-configuration slot. A quantity of consecutive REs occupied by each DMRS CDM group included in the DMRS symbol is greater than 2. Therefore, a quantity of DMRS ports supported by each DMRS CDM group is greater than 2, so that an uplink communication capacity of the terminal in the different-configuration slot can be increased when a quantity of DMRS CDM groups in each DMRS symbol remains unchanged, to meet an uplink transmission requirement of the terminal device. For example, each DMRS symbol includes three DMRS CDM groups. Therefore, uplink transmission may support more than six DMRS ports.

In a possible design, a value of n is 4.

In this design, it is assumed that each DMRS symbol includes three DMRS CDM groups. Therefore, the uplink transmission may support more than 12 DMRS ports, so that an uplink transmission capacity can be improved.

In a possible design, the third information may indicate a symbol position of a front-loaded DMRS symbol in the different-configuration slot, and indicate a symbol position of an additional DMRS symbol in the different-configuration slot. The symbol position of the front-loaded DMRS symbol is an $m^{th}$ symbol occupied by the PDCCH CORESET of the second network device in the different-configuration slot, and the symbol position of the additional DMRS symbol is an $m^{th}$ symbol occupied by a PDSCH of the second network device in the different-configuration slot, where m is 1 or 2.

In this design, the first network device may obtain an interference covariance matrix for a PDCCH of the second network device based on the front-loaded DMRS symbol, and obtain an interference covariance matrix for the PDSCH of the second network device based on the additional DMRS symbol. Neighboring cell interference can be more effectively suppressed based on the two covariance matrices, to improve transmission quality.

In a possible design, the first network device is a micro site accessed by the terminal device, and the second network device is a macro site.

According to a second aspect, an embodiment of the present disclosure provides a communication method. The method may be performed by a first network device or a component (for example, a processor, a chip, or a chip system) in the first network device.

The following provides descriptions by using an example in which the method is performed by the network device. According to the method, the first network device may send first information, second information, third information, and fourth information to a terminal device.

The first information may indicate a position of a time-frequency resource occupied by a PDCCH CORESET of a second network device. The second information indicates that each DMRS CDM group included in a DMRS symbol occupies n REs consecutive in frequency domain, where n is a positive integer and is greater than 2. The third information may indicate a symbol position of the DMRS symbol in a different-configuration slot. The fourth information indicates a time domain position of at least one different-configuration slot. The first network device may further send uplink grant information to the terminal device, where the uplink grant information indicates a position of a time-frequency resource for uplink data of the terminal device.

The first network device receives the DMRS symbol from the terminal device in a first different-configuration slot based on the second information and the third information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET of the second network device.

The first information may be from the second network device.

In a possible design, a value of n is 4.

In a possible design, the third information may indicate a symbol position of a front-loaded DMRS symbol in the different-configuration slot, and indicate a symbol position of an additional DMRS symbol in the different-configuration slot. The symbol position of the front-loaded DMRS symbol is an $m^{th}$ symbol occupied by the PDCCH CORESET of the second network device in the different-configuration slot, and the symbol position of the additional DMRS symbol is an $m^{th}$ symbol occupied by a PDSCH of the second network device in the different-configuration slot, where m is 1 or 2.

In a possible design, the first network device may determine a first interference covariance matrix based on a first DMRS symbol, and determine a second interference covariance matrix based on a second DMRS symbol. The first network device may perform Wiener filtering based on the first interference covariance matrix and the second interference covariance matrix.

In a possible design, the first network device is a micro site accessed by the terminal device, and the second network device is a macro site.

For beneficial effects of the second aspect and the possible designs of the second aspect, refer to the descriptions of the beneficial effects of the method in the first aspect and the possible designs of the first aspect.

According to a third aspect, an embodiment of the present disclosure provides a communication method. The method may be performed by a terminal device or a component (for example, a processor, a chip, or a chip system) in the terminal device.

The following provides descriptions by using an example in which the method is performed by the terminal device. According to the method, the terminal device may receive first information, fourth information, and fifth information from a first network device. The first information indicates a position of a time-frequency resource occupied by a PDCCH CORESET of a second network device. The fifth information indicates a symbol position of a front-loaded DMRS symbol, a length of the front-loaded DMRS symbol is 2, and a time domain position of the front-loaded DMRS symbol overlaps a last symbol occupied by the PDCCH CORESET in a different-configuration slot, and overlaps the first symbol occupied by a PDSCH of the second network device. The fourth information indicates a time domain position of at least one different-configuration slot. The first network device is located within coverage of the second network device.

The terminal device may further receive uplink grant information from the first network device, where the uplink grant information indicates a position of a time-frequency resource for uplink data of the terminal device.

The terminal device sends the front-loaded DMRS symbol to the first network device in a first different-configuration slot based on the fifth information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

According to the method, the terminal device may send the front-loaded DMRS symbol based on a configuration of the first network device, and the front-loaded DMRS symbol overlaps 5 the position of the time-frequency resource occupied by the PDCCH CORESET of a macro site and the position of the time-frequency resource occupied by the PDSCH of the macro site. Therefore, a third interference covariance matrix obtained through measurement based on the DMRS symbol may represent an average of an interference covariance matrix for a PDCCH of the macro site and an interference covariance matrix for the PDSCH of the macro site. A micro site performs Wiener filtering based on the third interference covariance matrix, so that neighboring cell interference caused by the macro site can be suppressed to some extent. This manner leads to a small change to a design of a baseband chip, is highly implementable, and has robustness.

In a possible design, the first network device is the micro site accessed by the terminal device, and the second network device is the macro site.

According to a fourth aspect, an embodiment of the present disclosure provides a communication method. The method may be performed by a first network device or a component (for example, a processor, a chip, or a chip system) in the first network device.

The following provides descriptions by using an example in which the method is performed by the network device. According to the method, the first network device may send first information, fourth information, and fifth information to a terminal device. The first information indicates a position of a time-frequency resource occupied by a PDCCH CORESET of a second network device. The fifth information indicates a symbol position of a front-loaded DMRS symbol, a length of the front-loaded DMRS symbol is 2, and a time domain position of the front-loaded DMRS symbol overlaps a last symbol occupied by the PDCCH CORESET in a different-configuration slot, and overlaps the first symbol occupied by a PDSCH of the second network device. The fourth information indicates a time domain position of at least one different-configuration slot. The first network device is located within coverage of the second network device. The terminal device may further receive uplink grant information from the first network device, where the uplink grant information indicates a position of a time-frequency resource for uplink data of the terminal device.

The first network device may further send the uplink grant information to the terminal device, where the uplink grant information indicates the position of the time-frequency resource for the uplink data of the terminal device.

The first network device may further receive the front-loaded DMRS symbol from the terminal device in a first different-configuration slot based on the fifth information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

In a possible design, the first network device may further determine a third interference covariance matrix based on the front-loaded DMRS symbol, and perform Wiener filtering based on the third interference covariance matrix.

In a possible design, the first network device is a micro site accessed by the terminal device, and the second network device is a macro site.

For beneficial effects of the fourth aspect and the possible designs of the fourth aspect, refer to the descriptions of the beneficial effects of the method in the third aspect and the possible designs of the third aspect.

According to a fifth aspect, an embodiment of the present disclosure provides a communication apparatus, where the communication apparatus can implement the method according to any one of the first aspect or the possible implementations of the first aspect. The apparatus includes a corresponding unit or component configured to perform the foregoing method. The unit included in the apparatus may be implemented by software and/or hardware. The apparatus may be, for example, a terminal device, or a chip, a chip system, a processor, or the like that can support the terminal device in implementing the foregoing method.

In a possible design, a structure of the communication apparatus may include a communication module, a processing module, and the like. These modules may perform a corresponding function of the terminal device in the first aspect or the possible design examples of the first aspect. For example, the communication module may be configured to support the communication apparatus in receiving and sending a signal, data, information, or a message. The processing module may be configured to process the signal, the data, the information, or the message received by the communication module, or generate the signal, the data, the information, or the message to be sent by the communication module.

When the method described in the first aspect is performed, the communication module may receive first information, second information, third information, and fourth information from a first network device. The first information may indicate a position of a time-frequency resource occupied by a PDCCH CORESET of a second network device. The second information indicates that each DMRS CDM group included in a DMRS symbol occupies n REs consecutive in frequency domain, where n is a positive integer and is greater than 2. The third information may indicate a symbol position of the DMRS symbol in a different-configuration slot. The fourth information indicates a time domain position of at least one different-configuration slot. The first network device is located within coverage of the second network device. The communication module may further receive uplink grant information from the first network device. The uplink grant information indicates a position of a time-frequency resource for uplink data of the terminal device. The communication module may send the DMRS symbol to the first network device in a first different-configuration slot based on the second information and the third information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

In a possible design, a value of n is 4.

In a possible design, the third information may indicate a symbol position of a front-loaded DMRS symbol in the different-configuration slot, and indicate a symbol position of an additional DMRS symbol in the different-configuration slot. The symbol position of the front-loaded DMRS symbol is an $m^{th}$ symbol occupied by the PDCCH CORESET of the second network device in the different-configuration slot, and the symbol position of the additional DMRS symbol is an $m^{th}$ symbol occupied by a PDSCH of the second network device in the different-configuration slot, where m is 1 or 2.

In a possible design, the first network device is a micro site accessed by the terminal device, and the second network device is a macro site.

In addition, the structure of the communication apparatus may include a processor, and optionally, further include a communication interface and a memory. The communication interface may be configured to receive and send information or data, and may be used by the communication apparatus to communicate and interact with another communication apparatus (for example, the first network device) in a network system. The processor is configured to support the communication apparatus in performing a corresponding function of the terminal device in the first aspect or the possible design examples of the first aspect. The memory is coupled to the processor, and is configured to store program instructions and data that are necessary for the communication apparatus. For example, communication interface may be configured to perform the step performed by the communication module in the fifth aspect, and the processor may be configured to perform the step performed by the processing module in the fifth aspect.

For beneficial effects of the fifth aspect and the possible designs of the fifth aspect, refer to the descriptions of the beneficial effects of the method in the first aspect and the possible designs of the first aspect.

According to a sixth aspect, an embodiment of the present disclosure provides a communication apparatus, where the communication apparatus can implement the method according to any one of the second aspect or the possible implementations of the second aspect. The apparatus includes a corresponding unit or component configured to perform the foregoing method. The unit included in the apparatus may be implemented by software and/or hardware. The apparatus may be, for example, a first network device, or a chip, a chip system, a processor, or the like that can support the first network device in implementing the method according to any one of the second aspect or the possible implementations of the second aspect.

In a possible design, a structure of the communication apparatus may include a communication module, a processing module, and the like. These modules may perform a corresponding function of the first network device in the second aspect or the possible design examples of the second aspect. For example, the communication module may be configured to support the communication apparatus in receiving and sending a signal, data, information, or a message. The processing module may be configured to process the signal, the data, the information, or the message received by the communication module, or generate the signal, the data, the information, or the message to be sent by the communication module.

When the method described in the second aspect is performed, the communication module may send first information, second information, third information, and fourth information to a terminal device. The first information may indicate a position of a time-frequency resource occupied by a PDCCH CORESET of a second network device. The second information indicates that each DMRS CDM group included in a DMRS symbol occupies n REs consecutive in frequency domain, where n is a positive integer and is greater than 2. The third information may indicate a symbol position of the DMRS symbol in a different-configuration slot. The fourth information indicates a time domain position of at least one different-configuration slot. The first network device is located within coverage of the second network device. The communication module may further send uplink grant information to the terminal device, where the uplink grant information indicates a position of a time-frequency resource for uplink data of the terminal device. The communication module may further receive the DMRS symbol from the terminal device in a first different-configuration slot based on the second information and the third information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET of the second network device.

In a possible design, a value of n is 4.

In a possible design, the third information may indicate a symbol position of a front-loaded DMRS symbol in the different-configuration slot, and indicate a symbol position of an additional DMRS symbol in the different-configuration slot. The symbol position of the front-loaded DMRS symbol is an $m^{th}$ symbol occupied by the PDCCH CORESET of the second network device in the different-configuration slot, and the symbol position of the additional DMRS symbol is an $m^{th}$ symbol occupied by a PDSCH of the second network device in the different-configuration slot, where m is 1 or 2.

In a possible design, the processing module may determine a first interference covariance matrix based on a first DMRS symbol, and determine a second interference covariance matrix based on a second DMRS symbol. The first network device may perform Wiener filtering based on the first interference covariance matrix and the second interference covariance matrix.

In a possible design, the first network device is a micro site accessed by the terminal device, and the second network device is a macro site.

In addition, the structure of the communication apparatus may include a processor, and optionally, further include a communication interface and a memory. The communication interface may be configured to receive and send information or data, and may be used by the communication apparatus to communicate and interact with another communication apparatus (for example, the terminal device) in a network system. The processor is configured to support the communication apparatus in performing a corresponding function of the first network device in the second aspect or the possible design examples of the second aspect. The memory is coupled to the processor, and is configured to store program instructions and data that are necessary for the communication apparatus. For example, a transceiver may be configured to perform the step performed by the communication module in the sixth aspect, and the processor may be configured to perform the step performed by the processing module in the sixth aspect.

For beneficial effects of the sixth aspect and the possible designs of the sixth aspect, refer to the descriptions of the beneficial effects of the method in the first aspect and the possible designs of the first aspect.

According to a seventh aspect, an embodiment of the present disclosure provides a communication apparatus, where the communication apparatus can implement the method according to any one of the third aspect or the possible implementations of the third aspect. The apparatus includes a corresponding unit or component configured to perform the foregoing method. The unit included in the apparatus may be implemented by software and/or hardware. The apparatus may be, for example, a terminal device, or a chip, a chip system, a processor, or the like that can support the terminal device in implementing the foregoing method.

In a possible design, a structure of the communication apparatus may include a communication module, a processing module, and the like. These modules may perform a corresponding function of the terminal device in the third aspect or the possible design examples of the third aspect. For example, the communication module may be configured to support the communication apparatus in receiving and sending a signal, data, information, or a message. The processing module may be configured to process the signal, the data, the information, or the message received by the communication module, or generate the signal, the data, the information, or the message to be sent by the communication module.

When the method described in the third aspect is performed, the communication module may receive first information, fourth information, and fifth information from a first network device. The first information indicates a position of a time-frequency resource occupied by a PDCCH CORESET of a second network device. The fifth information indicates a symbol position of a front-loaded DMRS symbol, a length of the front-loaded DMRS symbol is 2, and a time domain position of the front-loaded DMRS symbol overlaps a last symbol occupied by the PDCCH CORESET in a different-configuration slot, and overlaps the first symbol occupied by a PDSCH of the second network device. The fourth information indicates a time domain position of at least one different-configuration slot. The first network device is located within coverage of the second network device. The communication module may further receive uplink grant information from the first network device, where the uplink grant information indicates a position of a time-frequency resource for uplink data of the terminal device. The communication module may send the front-loaded DMRS symbol to the first network device in a first different-configuration slot based on the fifth information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

In a possible design, the first network device is a micro site accessed by the terminal device, and the second network device is a macro site.

In addition, the structure of the communication apparatus may include a processor, and optionally, further include a communication interface and a memory. The communication interface may be configured to receive and send information or data, and may be used by the communication apparatus to communicate and interact with another communication apparatus (for example, the first network device) in a network system. The processor is configured to support the communication apparatus in performing a corresponding function of the terminal device in the third aspect or the possible design examples of the third aspect. The memory is coupled to the processor, and is configured to store program instructions and data that are necessary for the communication apparatus. For example, the communication interface may be configured to perform the step performed by the communication module in the seventh aspect, and the processor may be configured to perform the step performed by the processing module in the seventh aspect.

For beneficial effects of the seventh aspect and the possible designs of the seventh aspect, refer to the descriptions of the beneficial effects of the method in the third aspect and the possible designs of the third aspect.

According to an eighth aspect, an embodiment of the present disclosure provides a communication apparatus, where the communication apparatus can implement the method according to any one of the fourth aspect or the possible implementations of the fourth aspect. The apparatus includes a corresponding unit or component configured to perform the foregoing method.

The unit included in the apparatus may be implemented by software and/or hardware. The apparatus may be, for example, a first network device, or a chip, a chip system, a processor, or the like that can support the first network device in implementing the method according to any one of the fourth aspect or the possible implementations of the fourth aspect.

In a possible design, a structure of the communication apparatus may include a communication module, a processing module, and the like. These modules may perform a corresponding function of the first network device in the fourth aspect or the possible design examples of the fourth aspect. For example, the communication module may be configured to support the communication apparatus in receiving and sending a signal, data, information, or a message. The processing module may be configured to process the signal, the data, the information, or the message received by the communication module, or generate the signal, the data, the information, or the message to be sent by the communication module.

When the method described in the fourth aspect is performed, the communication module may send first information, fourth information, and fifth information to a terminal device. The first information indicates a position of a time-frequency resource occupied by a PDCCH CORESET of a second network device. The fifth information indicates a symbol position of a front-loaded DMRS symbol, a length of the front-loaded DMRS symbol is 2, and a time domain position of the front-loaded DMRS symbol overlaps a last symbol occupied by the PDCCH CORESET in a different-configuration slot, and overlaps the first symbol occupied by a PDSCH of the second network device. The fourth information indicates a time domain position of at least one different-configuration slot. The first network device is located within coverage of the second network device. The terminal device may further receive uplink grant information from the first network device, where the uplink grant information indicates a position of a time-frequency resource for uplink data of the terminal device.

The communication module may further send the uplink grant information to the terminal device, where the uplink grant information indicates the position of the time-frequency resource for the uplink data of the terminal device.

The communication module may further receive the front-loaded DMRS symbol from the terminal device in a first different-configuration slot based on the fifth information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

In a possible design, the processing module may determine a third interference covariance matrix based on the front-loaded DMRS symbol, and perform Wiener filtering based on the third interference covariance matrix.

In a possible design, the first network device is a micro site accessed by the terminal device, and the second network device is a macro site.

In addition, the structure of the communication apparatus may include a processor, and optionally, further include a communication interface and a memory. The communication interface may be configured to receive and send information or data, and may be used by the communication apparatus to communicate and interact with another communication apparatus (for example, the terminal device) in a network system. The processor is configured to support the communication apparatus in performing a corresponding function of the first network device in the fourth aspect or the possible design examples of the fourth aspect. The memory is coupled to the processor, and is configured to store program instructions and data that are necessary for the communication apparatus. For example, the communication interface may be configured to perform the step performed by the communication module in the eighth aspect, and the processor may be configured to perform the step performed by the processing module in the eighth aspect.

For beneficial effects of the eighth aspect and the possible designs of the eighth aspect, refer to the descriptions of the beneficial effects of the method in the third aspect and the possible designs of the third aspect.

According to a ninth aspect, an embodiment of the present disclosure provides a communication system. The communication system may include the communication apparatus provided in the fifth aspect and the communication apparatus provided in the sixth aspect.

For beneficial effects of the ninth aspect and the possible designs of the ninth aspect, refer to the descriptions of the beneficial effects of the method in the first aspect and the possible designs of the first aspect.

According to a tenth aspect, an embodiment of the present disclosure provides a communication system. The communication system may include the communication apparatus provided in the seventh aspect and the communication apparatus provided in the eighth aspect.

For beneficial effects of the tenth aspect and the possible designs of the tenth aspect, refer to the descriptions of the beneficial effects of the method in the third aspect and the possible designs of the third aspect.

According to an eleventh aspect, the present disclosure provides a computer storage medium. The computer storage medium stores a program. When the program is invoked and executed on a computer, the computer is enabled to perform the method according to any one of the first aspect and the possible designs of the first aspect, the second aspect and the possible designs of the second aspect, the third aspect and the possible designs of the third aspect, or the fourth aspect and the possible designs of the fourth aspect.

When the method according to any one of the first aspect and the possible designs of the first aspect or the second aspect and the possible designs of the second aspect is performed, for beneficial effects in the eleventh aspect and the possible designs of the eleventh aspect, refer to the descriptions of the beneficial effects of the method in the first aspect and the possible designs of the first aspect. When the method according to any one of the third aspect and the possible designs of the third aspect or the fourth aspect and the possible designs of the fourth aspect is performed, for beneficial effects in the eleventh aspect and the possible designs of the eleventh aspect, refer to the descriptions of the beneficial effects of the method in the third aspect and the possible designs of the third aspect.

According to a twelfth aspect, the present disclosure provides a computer program product. The computer program product may include a program or instructions. When the computer program product runs on a computer, the computer is enabled to perform the method according to any one of the first aspect and the possible designs of the first aspect, the second aspect and the possible designs of the second aspect, the third aspect and the possible designs of the third aspect, or the fourth aspect and the possible designs of the fourth aspect.

When the method according to any one of the first aspect and the possible designs of the first aspect or the second aspect and the possible designs of the second aspect is performed, for beneficial effects in the twelfth aspect and the possible designs of the twelfth aspect, refer to the descriptions of the beneficial effects of the method in the first aspect and the possible designs of the first aspect. When the method according to any one of the third aspect and the possible designs of the third aspect or the fourth aspect and the possible designs of the fourth aspect is performed, for beneficial effects in the twelfth aspect and the possible designs of the twelfth aspect, refer to the descriptions of the beneficial effects of the method in the third aspect and the possible designs of the third aspect.

According to a thirteenth aspect, the present disclosure provides a chip or a chip system including the chip. The chip may include a processor. The chip may further include a memory (or a storage module) and/or a transceiver (or a communication module). The chip may be configured to perform the method according to any one of the first aspect and the possible designs of the first aspect, the second aspect and the possible designs of the second aspect, the third aspect and the possible designs of the third aspect, or the fourth aspect and the possible designs of the fourth aspect. The chip system may include the chip, or may include the chip and another discrete component, for example, a memory (or a storage module) and/or a transceiver (or a communication module).

When the method according to any one of the first aspect and the possible designs of the first aspect or the second aspect and the possible designs of the second aspect is performed, for beneficial effects in the thirteenth aspect and the possible designs of the thirteenth aspect, refer to the descriptions of the beneficial effects of the method in the first aspect and the possible designs of the first aspect. When the method according to any one of the third aspect and the possible designs of the third aspect or the fourth aspect and the possible designs of the fourth aspect is performed, for beneficial effects in the thirteenth aspect and the possible designs of the thirteenth aspect, refer to the descriptions of the beneficial effects of the method in the third aspect and the possible designs of the third aspect.

DESCRIPTION OF EMBODIMENTS

To improve flexibility of indicating a frequency domain resource for multicast transmission, the present disclosure provides a communication method. The following further describes the present disclosure in detail with reference to accompanying drawings. It should be understood that specific operation methods in the following method embodiments may also be applied to apparatus embodiments or system embodiments.

Figure 1:
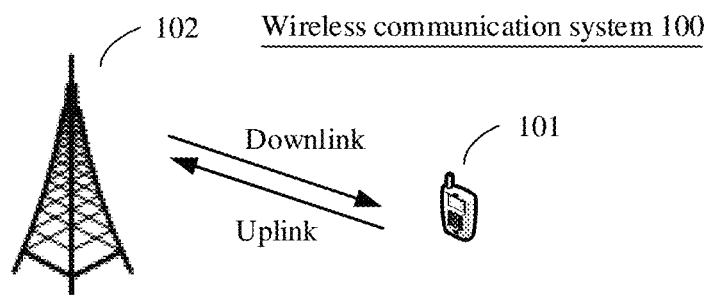
FIG. 1 is a schematic diagram of an architecture of a communication system according to an embodiment of the present disclosure.

As shown in FIG. 1, a wireless communication system 100 provided in an embodiment of the present disclosure includes a terminal device 101 and a network device 102. An application scenario of the wireless communication system 100 includes but is not limited to a long term evolution (LTE) system, a new radio (NR) system in 5th generation (5G) mobile communication systems, a future mobile communication system, and the like.

For example, the terminal device 101 may be a terminal, a mobile station (MS), or a mobile terminal, or may be a chip or a chip system. The terminal device 101 may have a wireless transceiver function, and can communicate with one or more network devices in one or more communication systems, and accept a network service provided by the network device. The network device herein includes but is not limited to the network device 102 shown in the figure. For example, in this embodiment of the present disclosure, the terminal device 101 may be a mobile phone (or referred to as a "cellular" phone) or a computer having a mobile terminal. Alternatively, the terminal device 101 may be a portable, pocket-sized, handheld, computer built-in, or in-vehicle mobile apparatus. Alternatively, the terminal device 101 may be a communication chip having a communication module. It should be understood that the terminal device 101 may be configured to support communication with the network device through a universal user-to-network interface (Uu interface).

The terminal device 101 described above may be UE, a terminal, an access terminal, a terminal unit, a terminal station, a mobile station (MS), a remote station, a remote terminal, a mobile terminal, a wireless communication device, a terminal agent, a terminal device, or the like. The terminal device 101 may alternatively be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, a terminal apparatus in a 5G network, a terminal apparatus in a future evolved PLMN, or the like.

In addition, the terminal device 101 may be deployed on land, and includes an indoor or outdoor device, a handheld device, or a vehicle-mounted device. The terminal device 101 may alternatively be deployed on water (for example, on a ship). The terminal device 101 may alternatively be deployed in the air (for example, on an airplane, a balloon, and a satellite). The terminal device 101 may be specifically a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. The terminal device may alternatively be a communication chip having a communication module, a vehicle having a communication function, a vehicle-mounted device (for example, an in-vehicle communication apparatus or an in-vehicle communication chip), or the like.

The network device 102 may be an access network device (or referred to as an access network site). The access network device is a device that provides a network access function, for example, a radio access network (RAN) base station. The network device 102 may specifically include a base station (BS), or include a base station, a radio resource management device configured to control the base station, and the like. The network device 102 may further include a relay station, an access point, a base station in a 5G network, a base station in a future evolved PLMN, an NR base station, or the like. The network device 102 may be a wearable device or a vehicle-mounted device. Alternatively, the network device 102 may be a chip having a communication module. It should be understood that, in the present disclosure, the network device 102 may support Uu interface-based communication. The network device 102 may access a core network, for example, a 5G core network, to obtain a service on a core network side.

For example, the network device 102 includes but is not limited to: a gNB, an evolved NodeB (eNB) in an LTE system, a radio network controller (RNC), a radio controller in a CRAN system, a base station controller (BSC), a home base station (for example, a home evolved nodeB or a home nodeB, HNB), a baseband unit (BBU), a transmission reception point (TRP), a transmission point (TP), a mobile switching center, or the like. The network device 102 may further include a base station in a future 6G or later mobile communication system.

In a current wireless communication technology, a transmission resource may be divided into a plurality of radio frames (or referred to as radio frame structures) in time domain, and a length of each radio frame is 10 milliseconds (ms). One radio frame further includes a plurality of slots, and one slot may include 14 orthogonal frequency division multiplexing (OFDM) symbols. When a subcarrier spacing (SCS) is 15 kilohertz (kHz), a time domain length of one slot is 1 ms. When an SCS is 30 kHz, a time domain length of one slot is 0.5 ms. A transmission direction of an OFDM symbol in a slot may be downlink (DL), uplink (UL), or flexible, and a combination of transmission directions of symbols in a slot may be understood as a format of the slot.

For example, several slot formats are specified in the current TS 38.211 standard of NR, and an excerpt part is shown in Table 1.

TABLE 1

| Format | Symbols in a slot | | | | | | | | | | | | | |
| --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| ... | | | | | | | | | | | | | | |
| 27 | D | D | D | X | X | X | X | X | X | X | X | U | U | U |
| ... | | | | | | | | | | | | | | |

In Table 1, D represents DL, U represents UL, and X represents flexible. The format 27 is used as an example. A slot format represented by the format 27 is as follows: The first three symbols are for DL transmission, the last three symbols are for UL transmission, and the eight symbols in the middle are flexible, to be specific, may be for uplink transmission or downlink transmission, or may not be for transmission, and may be flexibly configured.

Slots in the format 0 and the format 1 enumerated in Table 1 are referred to as a downlink slot and an uplink slot respectively. The slots in the two formats are mainly used in actual communication. A ratio of an uplink slot to a downlink slot in time domain is referred to as a TDD uplink-downlink configuration.

Figure 2:
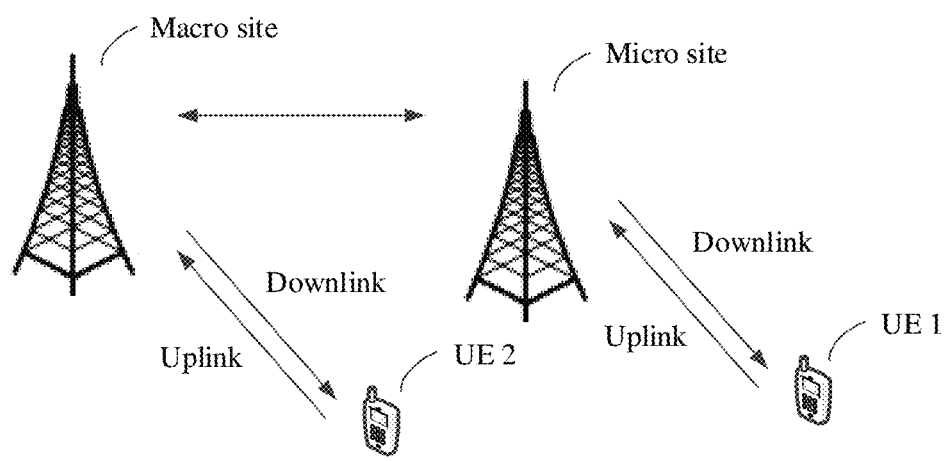
FIG. 2 is a schematic diagram of an architecture of another communication system according to an embodiment of the present disclosure.

For example, as shown in FIG. 2, another wireless communication system provided in an embodiment of the present disclosure may include different types of network devices such as a macro site and a micro site. The macro site (which may be referred to as a macro site for short) has large coverage, is usually deployed outdoors, and bears a large quantity of users. The micro site (which may be referred to as a micro site for short) is generally small in size, has small coverage, bears a small quantity of users, and is usually deployed in indoor environments such as an industry or a building. In addition, the present disclosure does not limit a case in which the wireless communication system may further include more types of network devices such as a pico site and/or a femto site.

The macro site and the micro site may separately provide a service for UE. For example, the micro site may be configured to schedule data of UE 1 shown in FIG. 2, and the macro site may be configured to schedule data of UE 2 shown in FIG. 2. Therefore, the UE 1 and the UE 2 may be scheduled by the network devices to implement uplink and downlink data transmission.

It should be understood that the network device 102 shown in FIG. 1 may serve as the macro site or the micro site shown in FIG. 2.

For a common macro-site cell, a downlink service requirement is generally higher than an uplink service requirement. Therefore, slots of the macro cell that are configured by the macro site in FIG. 2 are mainly downlink slots, to meet the downlink service requirement of a user.

However, symbol directions of a micro-cite cell (or referred to as a micro cell) are mainly uplink directions. A factory as a micro cell is used as an example. A camera may be disposed for each machine in a factory to monitor the machine, to determine whether the machine runs normally. The camera needs to transmit a surveillance video to the micro site. Therefore, slots configured by the micro site shown in FIG. 2 are mainly uplink slots. Therefore, the following case exists: A slot is an uplink slot for the micro site, but is a downlink slot for the macro site. When receiving uplink data from the UE 1 in the slot, the micro site is interfered by downlink data sent by the macro site in the slot. Such a slot is a macro-micro different-configuration slot, referred to as a different-configuration slot for short.

In a typical macro-micro factory scenario, a level of co-frequency interference caused by a macro site to a micro site is −50 dBm, and a specific technical means needs to be used to cancel the co-frequency interference of −50 dBm to achieve an expected interference level of −90 dBm that meets a factory capacity. In this case, the micro site needs to accurately estimate and obtain, through measurement, an interference covariance matrix for downlink data sent by the macro site. At a receiving end of the micro site, a Wiener filtering algorithm may be used to cancel the co-frequency interference caused by the downlink data of the macro site, to achieve a desirable interference cancellation effect.

Currently, PUSCHs sent by micro-site UE may be classified into two types: a PUSCH type A and a PUSCH type B. In the present disclosure, a position of the first DMRS symbol is denoted as $l_0$. For the PUSCH type A, a value of $l_0$ is configured by a micro site by using a higher-layer parameter, namely, dmrs-TypeA-Position. For the PUSCH type B, $l_0$=0, to be specific, the first DMRS symbol is located in the $0^{th}$ OFDM symbol of a time domain slot.

In an existing DMRS symbol design manner, each DMRS symbol includes three DMRS CDM groups, and each DMRS CDM group supports only two frequency domain OCC code division sequences. Therefore, each CDM group supports only two DMRS ports. When a single-DMRS-symbol configuration is used, micro-site UE supports a maximum of six DMRS ports. Therefore, transmission of a maximum of six data streams is supported. Consequently, an uplink capacity is low, and cannot meet an uplink transmission requirement of the micro-site UE.

Embodiments of the present disclosure provide a communication method, to improve an uplink transmission capacity of the micro-site UE when a single-DMRS configuration (or referred to as a single-symbol DMRS configuration, which means that a length of each DMRS symbol is 1) is used, and improve transmission performance. The method may be implemented by a first network device, a second network device, and a terminal device. As shown in FIG. 2, the first network device may include the micro site shown in FIG. 2, the second network device may include the macro site shown in FIG. 2, and the terminal device may include the UE 1 shown in FIG. 2. The first network device and the terminal device may be respectively implemented by the network device 102 and the terminal device 101 shown in FIG. 1.

Figure 3:
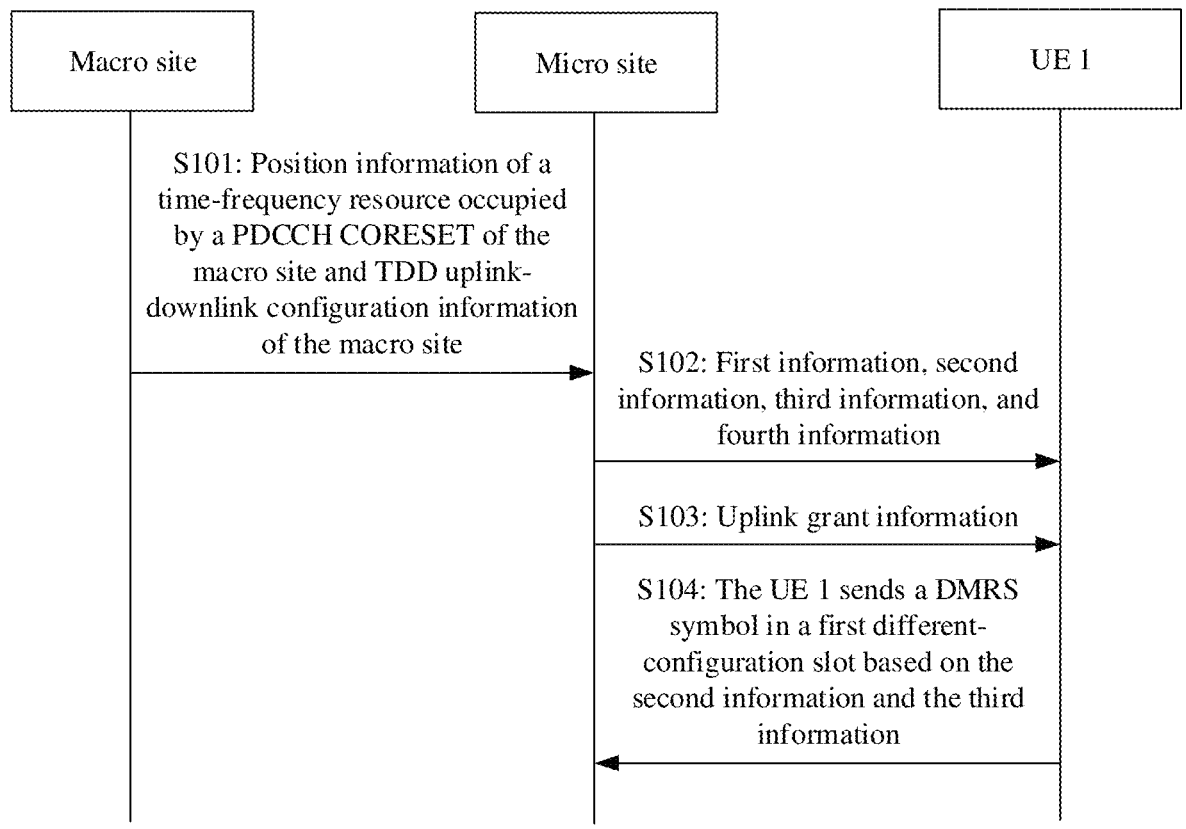
FIG. 3 is a schematic flowchart of a communication method according to an embodiment of the present disclosure.

The following uses the system shown in FIG. 2 as an example to describe a communication method provided in an embodiment of the present disclosure. As shown in FIG. 3, the method may include the following procedure.

S101: A macro site sends, to a micro site, position information of a time-frequency resource occupied by a PDCCH CORESET of the macro site and TDD uplink-downlink configuration information of the macro site.

The TDD uplink-downlink configuration information of the macro site may be used by the micro site to determine a position of a different-configuration slot. Specifically, the TDD uplink-downlink configuration information may indicate a ratio of a downlink slot to an uplink slot in every 10 slots of the macro site, and the micro site determines the different-configuration slot based on a ratio of a downlink slot to an uplink slot in every 10 slots of the micro site. For example, the TDD uplink-downlink configuration information of the macro site may indicate that an uplink-downlink configuration of the macro site is 8:2, in other words, in every 10 slots, the first eight slots are downlink slots, and the last two slots are uplink slots.

It should be understood that the TDD uplink-downlink configuration information may alternatively be replaced with information indicating positions of the TDD uplink slot and the TDD downlink slot of the macro site.

Correspondingly, the micro site may receive the position information of the time-frequency resource occupied by the PDCCH CORESET. Therefore, the micro site may receive data from the macro site based on a position of the time-frequency resource occupied by the PDCCH CORESET.

S102: The micro site sends first information, second information, third information, and fourth information to UE 1.

The first information indicates the position of the time-frequency resource occupied by the PDCCH CORESET of the macro site.

For example, the micro site may determine the first information based on the position information that is of the time-frequency resource occupied by the PDCCH CORESET and that is from the macro site. For example, the micro site forwards the position information of the time-frequency resource occupied by the PDCCH CORESET as the first information to the UE 1, or performs processing based on the position that is of the time-frequency resource and that is indicated by the position information, to form the first information.

The second information indicates that each DMRS code division multiplexing (CDM) group included in a DMRS symbol occupies n resource elements (REs) consecutive in frequency domain, where n is a positive integer and is greater than 2. For example, n=4 or n=6.

All DMRS ports supported by a same CDM group occupy a same time-frequency resource (same resource elements), and different DMRS ports are distinguished only in an OCC code division manner. In the present disclosure, the DMRS CDM group occupies n consecutive resource elements, and each DMRS CDM group can support a maximum of n DMRS antenna ports.

For example, the second information may indicate a frequency domain orthogonal cover code (OCC) design manner of the DMRS CDM group included in the DMRS symbol. Specifically, the second information may indicate the quantity n of consecutive REs occupied by each DMRS CDM group. Therefore, each DMRS CDM group may support n frequency domain OCC code division sequences, to be specific, each DMRS CDM group may support n DMRS ports, where n is greater than 2. If a design, in a conventional technology, in which a DMRS symbol includes three DMRS CDM groups is used, each DMRS symbol may support 3*n DMRS ports, so that a communication capacity can be improved.

The third information indicates a symbol position of the DMRS symbol in the different-configuration slot.

It should be understood that the DMRS symbol herein may include a front-loaded DMRS symbol, and the third information may indicate a symbol position of the front-loaded DMRS symbol in the different-configuration slot. For example, the symbol position of the front-loaded DMRS symbol is an $l_0^{th}$ symbol in the different-configuration slot, and the third information may indicate a value of $l_0$.

In addition, the DMRS symbol may include a front-loaded DMRS symbol and an additional DMRS symbol. In this case, the third information may indicate symbol positions of the front-loaded DMRS symbol and the additional DMRS symbol in the different-configuration slot. For example, the symbol position of the front-loaded DMRS symbol is an $l_0^{th}$ symbol in the different-configuration slot, the symbol position of the additional DMRS symbol is an $l_1^{th}$ symbol in the different-configuration slot, and the third information may indicate values of $l_0$ and $l_1$.

The fourth information indicates a time domain position of at least one different-configuration slot.

It should be understood that, in the present disclosure, a different-configuration slot is a slot in which a micro site simultaneously receives uplink data from UE and data from a macro site. In other words, a different-configuration slot is a slot in which a macro site sends downlink data and a micro site receives uplink data, or a different-configuration slot is a slot in which uplink/downlink directions of a macro site and a micro site are different. Therefore, for a different-configuration slot, the macro site sends downlink data in the slot, and the micro site receives uplink data from the UE in the slot.

For example, the micro site may receive the TDD uplink-downlink configuration information from the macro site, and determine the time domain position of the different-configuration slot based on the TDD uplink-downlink configuration information of the macro site and the TDD uplink-downlink configuration information of the micro site. For example, if a TDD uplink-downlink configuration of the micro site is 2:8, it indicates that in every 10 slots, downlink slots of the micro site are slots 0 and 1, and uplink slots of the micro site are slots 2 to 9. In addition, if the TDD uplink-downlink configuration information indicates that the TDD uplink-downlink configuration of the macro site is 8:2, it indicates that in every 10 slots, downlink slots of the macro site are slots 0 to 7, and uplink slots of the macro site are slots 8 and 9. In this case, the micro site may learn that the slot 2 to the slot 7 are different-configuration slots, to be specific, the third to the eighth slots in every 10 slots are different-configuration slots. In this case, the fourth information may indicate that the slot 2 to the slot 7 are the different-configuration slots, or indicate that the third to the eighth slots in every 10 slots are the different-configuration slots.

S103: The micro site sends uplink grant information to the UE 1, where the uplink grant information indicates a position of a time-frequency resource for uplink data of the UE 1.

For example, the time-frequency resource for the uplink data may be used by the UE 1 to transmit the uplink data. The uplink grant information may specifically indicate a time-frequency position of the time-frequency resource for the uplink data.

It should be understood that S103 may be performed after S102. For example, steps S101 and S102 are performed once after the UE 1 accesses the micro site, and are not repeatedly performed if the position information of the time-frequency resource occupied by the PDCCH CORESET of the macro site and the TDD uplink-downlink configuration information of the micro site and the macro site remain unchanged. S103 may be performed before the UE 1 performs uplink transmission each time. To be specific, after S101 and S102, the micro site may send one or more pieces of uplink grant information based on an uplink transmission requirement of the UE 1. An action of sending the uplink grant information each time may be considered as one time of S103, and step S103 performed each time may trigger execution of step S104.

S104: The UE 1 sends the DMRS symbol to the micro site in a first different-configuration slot based on the second information and the third information.

Correspondingly, the micro site receives the DMRS symbol from the UE 1 in the first different-configuration slot.

The first different-configuration slot is related to the first information, the fourth information, and the uplink grant information. Specifically, the first different-configuration slot is at least one of the at least one different-configuration slot indicated by the fourth information. The position that is of the time-frequency resource occupied by the uplink data of the UE 1 and that is indicated by the uplink grant information overlaps, in the first different-configuration slot, the position that is of the time-frequency resource occupied by the PDCCH CORESET of the macro site and that is indicated by the first information. It should be understood that sending the DMRS symbol herein means sending a DMRS on an uplink PUSCH, and the DMRS occupies one or more symbols in time domain. If one symbol is occupied, the DMRS may be referred to as a single-symbol DMRS. If two symbols are occupied, the DMRS may be referred to as a double-symbol DMRS.

For example, based on the second information, each DMRS CDM group included in the DMRS symbol sent by the UE 1 in the first different-configuration slot occupies n consecutive REs, where n>2. In addition, the symbol position of the DMRS symbol sent by the UE 1 in the first different-configuration slot is indicated by the third information.

The UE 1 may determine the first different-configuration slot according to the following method:

The UE 1 receives the uplink grant information from the micro site, traverses, based on the position that is of the time-frequency resource occupied by the uplink data and that is indicated by the uplink grant information, each different-configuration slot indicated by the fourth information, and determines whether the position of the time-frequency resource occupied by the uplink data in each different-configuration slot overlaps the position of the time-frequency resource for the PDCCH CORESET of the macro site in the different-configuration slot. It should be understood that overlapping between positions of time-frequency resources may also be referred to as that the positions of the time-frequency resources overlap.

If the UE 1 determines that the position of the time-frequency resource occupied by the uplink data overlaps, in a different-configuration slot, the position of the time-frequency resource for the PDCCH CORESET of the macro site, the different-configuration slot is the first different-configuration slot, and the UE 1 configures and sends the DMRS in the different-configuration slot based on the second information and the third information.

In addition, if the UE 1 determines that the position of the time-frequency resource occupied by the uplink data does not overlap, in a different-configuration slot, the position of the time-frequency resource for the PDCCH CORESET of the macro site, the UE 1 may configure and send the DMRS in an existing manner.

Similarly, because the first information, the fourth information, and the uplink grant information are known information for the micro site, the micro site may determine the first different-configuration slot by using a method similar to that used by the UE 1 to determine the first different-configuration slot.

According to the procedure shown in FIG. 3, the micro site may configure the UE 1 to send the DMRS symbol in the first different-configuration slot. The quantity of consecutive REs occupied by each DMRS CDM group included in the DMRS symbol is greater than 2. Therefore, a quantity of DMRS ports supported by each DMRS CDM group is greater than 2, so that the communication capacity can be increased when a quantity of DMRS CDM groups in each DMRS symbol remains unchanged, to meet the uplink transmission requirement of the UE 1.

For example, the micro site may configure that n=4. Therefore, each DMRS CDM group may support four frequency domain OCC code division sequences, to be specific, each DMRS CDM group may support four DMRS ports. Assuming that the DMRS symbol includes three DMRS CDM groups, each DMRS symbol may support 12 DMRS ports. This can meet an uplink transmission requirement in a scenario of micro sites such as a factory.

In a possible example, the third information may indicate the time domain position of the front-loaded DMRS symbol and the time domain position of the additional DMRS symbol. The symbol position of the front-loaded DMRS symbol is an $m^{th}$ symbol occupied by the PDCCH CORESET of the macro site in the different-configuration slot, and the symbol position of the additional DMRS symbol is an $m^{th}$ symbol occupied by a PDSCH of the macro site in the different-configuration slot, where m is 1 or 2. Correspondingly, the micro site may respectively determine a first interference covariance matrix (namely, an interference covariance matrix for a PDCCH of the macro site) and a second interference covariance matrix (namely, an interference covariance matrix for the PDSCH of the macro site) based on the front-loaded DMRS symbol and the additional DMRS symbol, and perform Wiener filtering based on the first interference covariance matrix and the second interference covariance matrix, to cancel neighboring cell interference.

In this example, the micro site may respectively obtain the first interference covariance matrix and the second interference covariance matrix based on the front-loaded DMRS symbol and the additional DMRS symbol, where the first interference covariance matrix and the second interference covariance matrix are the interference covariance matrices respectively for the PDCCH and the PDSCH of the macro site, so that the micro site more effectively suppresses the neighboring cell interference.

Figure 4:
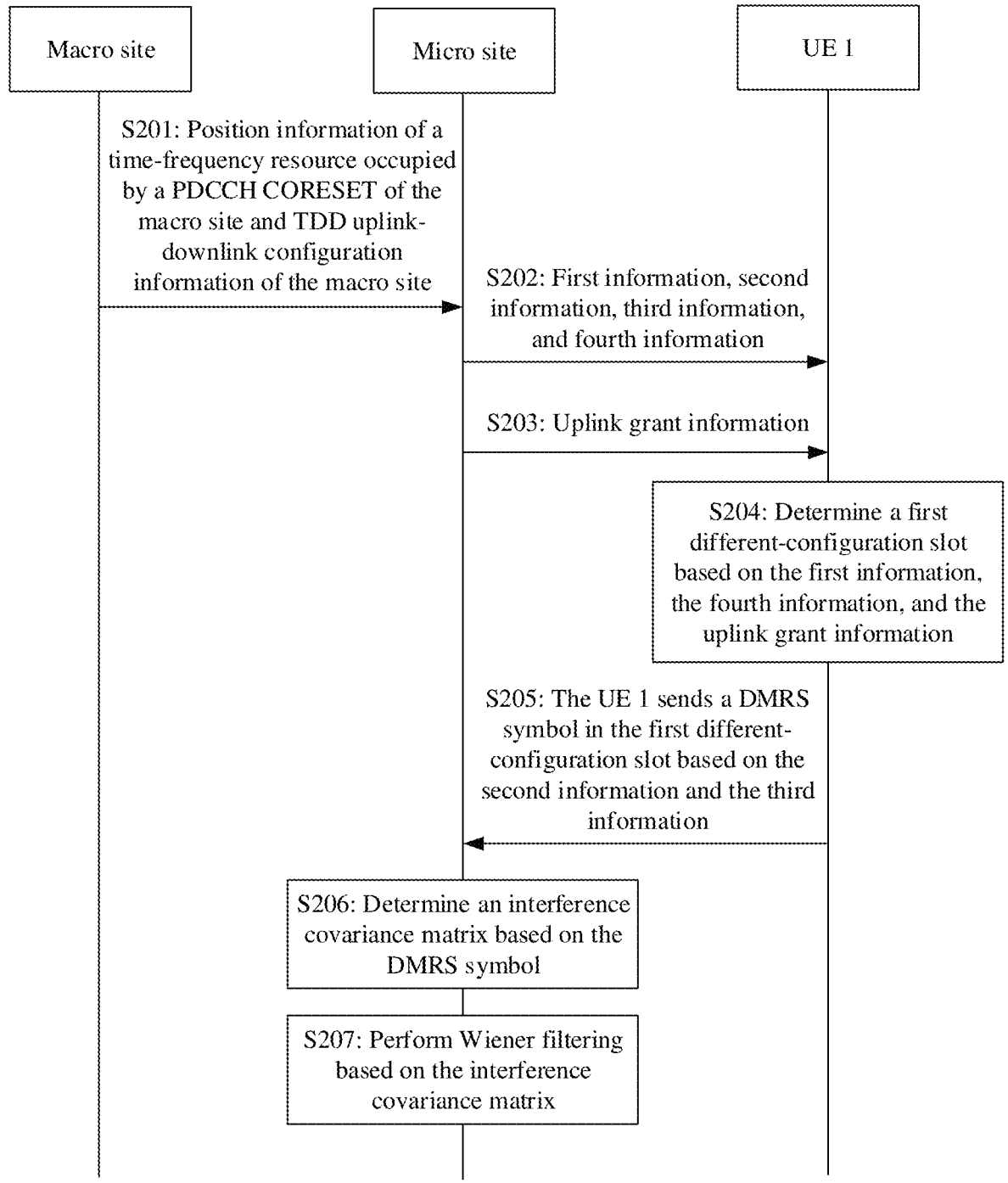
FIG. 4 is a schematic flowchart of another communication method according to an embodiment of the present disclosure.

With reference to FIG. 2, the following uses an example to describe an implementation process of a communication method provided in an embodiment of the present disclosure. As shown in FIG. 4, the method may include the following steps.

S201: A micro site receive from a macro site, through an X2 interface, TDD uplink-downlink configuration information of the macro site and position information of a time-frequency resource occupied by a PDCCH CORESET of the macro site.

For example, the micro site may learn, based on network planning, that there is only one macro site around the micro site, and learn a subcarrier spacing of the macro site. It is assumed that subcarrier spacings of the micro site and the macro site are both 30 kHz, in other words, a time length of each slot is 0.5 ms. A TDD uplink-downlink configuration of the micro site is 2:8, and a TDD uplink-downlink configuration of the macro site is 8:2. This means that the third to the eighth slots in every 10 slots are different-configuration slots. In these slots, the micro site performs uplink receiving, and the macro site performs downlink sending (where a process in which the macro site sends data to the micro site may be considered as downlink transmission).

S202: The micro site sends first information, second information, third information, and fourth information to UE 1.

The first information may include the position information that is of the time-frequency resource occupied by the PDCCH CORESET and that is from the macro site, or may be determined based on the position information to indicate a position of the time-frequency resource occupied by the PDCCH CORESET of the macro site.

The third slot in a radio frame is used as an example, and a position of the time-frequency resource occupied by the PDCCH CORESET of the macro site in the slot may be denoted as $\psi_1$={frequency domain: subcarriers #0 to #11 in each of PRBs #0, #1, . . . , and #$N_{RB}^{CORESET}$; time domain: symbols #0 and #1 of the third slot in each radio frame}. Similarly, the first information may indicate a position of the time-frequency resource occupied by the PDCCH CORE-SET of the macro site in each of the fourth to the eighth slots in the radio frame. In the present disclosure, #0 indicates that a number (or an index) is 0. For example, a subcarrier #0 represents a subcarrier whose number is 0, or is referred to as the first subcarrier.

Figure 5:
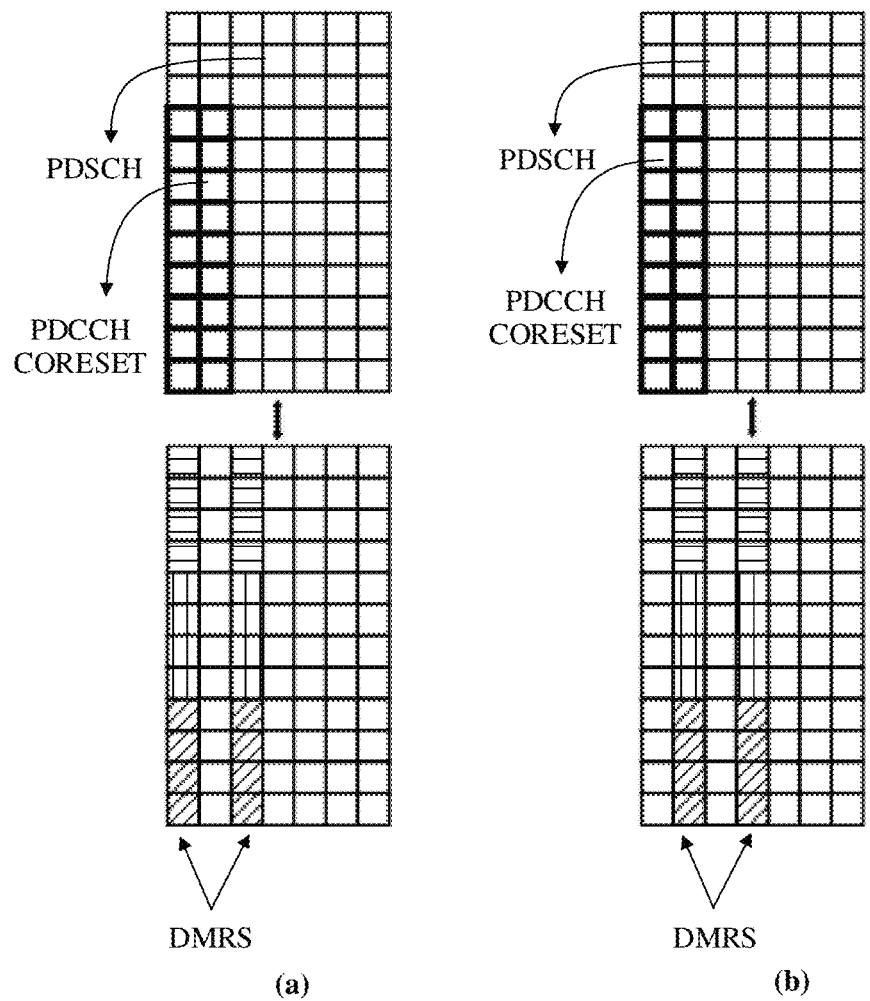
FIG. 5 is a schematic diagram of a time-frequency structure of a DMRS symbol according to an embodiment of the present disclosure.

The second information may indicate that each DMRS CDM group in a DMRS symbol occupies four consecutive REs. Therefore, each CDM group may support a frequency domain OCC sequence whose length is 4, so that each CDM group includes four orthogonal DMRS ports. For example, as shown in FIG. 5, different CDM groups in each DMRS symbol are distinguished by using different shadows. For example, a horizontal shadow part represents a CDM group, a vertical shadow part represents another CDM group, and an oblique shadow part represents still another CDM group. When a single-DMRS configuration is used, in other words, a length of each DMRS symbol is 1, the second information may indicate that one DMRS port occupies four consecutive subcarriers in frequency domain, and frequency domain subcarriers allocated to each CDM group are {#0 to #3, #4 to #7, #8 to #11}. Optionally, numbers of DMRS ports supported by DMRS symbols shown in (a) and (b) in FIG. 5 are respectively denoted as #0 to #11. A correspondence manner between DMRS ports and subcarriers may be: The DMRS ports #0, #3, #6, and #9 respectively correspond to the subcarriers #0 to #3, the ports #1, #4, #7, and #10 respectively correspond to the subcarriers #4 to #7, and the ports #2, #5, #8, and #11 respectively correspond to the subcarriers #8 to #11, so that one DMRS symbol supports 12 DMRS ports.

The third information may indicate a symbol position of the DMRS symbol in the different-configuration slot. If a single DMRS symbol is used, to be specific, the DMRS symbol is a front-loaded DMRS symbol, the third information may indicate a value of $l_0$. If $l_0=0$, the UE 1 may configure the position of the DMRS symbol as the first symbol of a first different-configuration slot. If $l_0$32 1, the UE 1 may configure the position of the DMRS symbol as the second symbol of a first different-configuration slot.

Further, a position of the front-loaded DMRS symbol may overlap the position of the time-frequency resource for the PDCCH CORESET of the macro site in the first different-configuration slot, so that the micro site obtains an interference covariance matrix for a PDCCH of the macro site through measurement based on the front-loaded DMRS symbol. The front-loaded DMRS symbol may be referred to as a DMRS corresponding to the PDCCH (DMRS for PDCCH). In addition, a position of an additional DMRS symbol may overlap a position of a PDSCH of the macro site in the first different-configuration slot, so that the micro site obtains an interference covariance matrix for the PDSCH of the macro site through measurement based on the front-loaded DMRS symbol. The additional DMRS symbol may be referred to as a DMRS corresponding to the PDSCH (DMRS for PDSCH).

Figure 6:
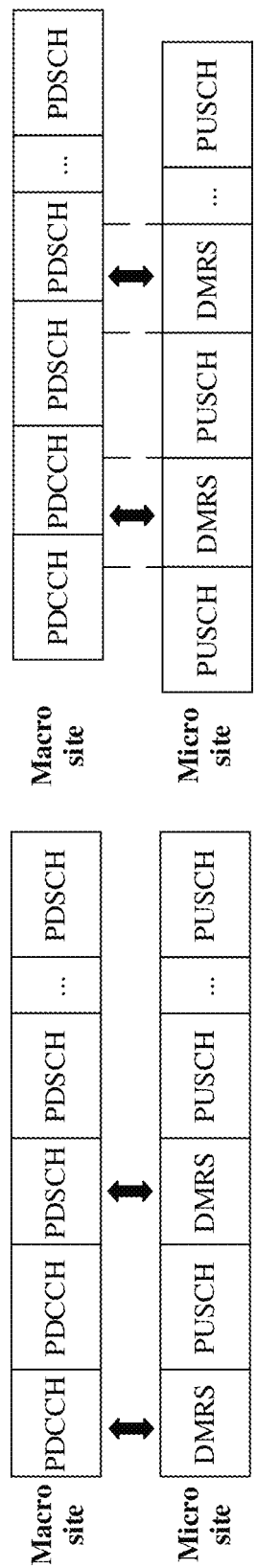
FIG. 6 is a schematic diagram of a time domain structure of a DMRS symbol according to an embodiment of the present disclosure.

For example, if the DMRS symbol includes the front-loaded DMRS symbol and the additional DMRS symbol, the third information may indicate values of $l_0$ and $l_1$. FIG. 5 and FIG. 6 are respectively schematic diagrams of a time-frequency resource and a time domain resource in the first different-configuration slot. As shown in (a) in FIG. 5 and (a) in FIG. 6, if $l_0=0$ and $l_1=2$, the UE 1 may configure a position of the front-loaded DMRS symbol as the first symbol of the first different-configuration slot, and configure the additional DMRS symbol as the third symbol. It can be learned that the position of the front-loaded DMRS symbol shown in (a) in FIG. 5 overlaps the position of the time-frequency resource (for example, time-frequency resources shown by bold boxes in (a) and (b) in FIG. 5) for the PDCCH CORESET of the macro site, and the position of the additional DMRS symbol overlaps a position of a time-frequency resource for the PDSCH of the macro site.

Further, as shown in (b) in FIG. 5 and (b) in FIG. 6, if $l_0=1$ and $l_1=3$, the UE 1 may configure the position of the front-loaded DMRS symbol as the second symbol of the first different-configuration slot, and configure the additional DMRS symbol as the fourth symbol.

The fourth information may indicate a time domain position of the different-configuration slot. For example, the fourth information may include a set of the time domain positions of the different-configuration slot. For example, the fourth information may indicate that the third to the eighth slots in every 10 slots are different-configuration slots.

S203: The micro site sends uplink grant information to the UE 1.

The uplink grant information includes position information of a time-frequency resource on which the UE 1 sends uplink data to the micro site.

S204: The UE 1 determines the first different-configuration slot based on the first information, the fourth information, and the uplink grant information.

For example, the position of the time-frequency resource occupied by the PDCCH CORESET of the macro site is W1, and the different-configuration slots indicated by the fourth information are the third to the eighth slots in every 10 slots. In this case, after receiving the uplink grant information, the UE 1 traverses the third to the eighth slots in every 10 slots, and determines whether the time-frequency resource, in each slot, that is for the uplink data and that is indicated by the uplink grant information belongs to $\psi_1$; and if yes, the UE 1 specifies the slot as the first different-configuration slot; otherwise, the UE 1 determines that the slot is not the first different-configuration slot.

Similarly, because the first information, the fourth information, and the uplink grant information are all known information for the micro site, the micro site may determine the first different-configuration slot in a similar manner. A specific manner is not described in detail.

S205: The UE 1 sends the DMRS in the first different-configuration slot based on the second information and the third information.

The DMRS is carried in the uplink data sent by the UE 1 to the micro site.

In addition, the UE 1 may further send the DMRS in a different-configuration slot (which may be referred to as a second different-configuration slot below) other than the first different-configuration slot in an existing manner.

S206: The micro site receives, in the first different-configuration slot, the DMRS symbol sent based on the second information and the third information, and determines an interference covariance matrix based on the DMRS symbol.

If the DMRS symbol includes the front-loaded DMRS symbol and the additional DMRS symbol, and if $l_0=0$ and $l_1=2$ as shown in (a) in FIG. 5 and (a) in FIG. 6, or if $l_0=1$ and $l_1=3$ as shown in (b) in FIG. 5 and (b) in FIG. 6, the micro site may obtain a first interference covariance matrix through measurement based on the front-loaded DMRS symbol, and obtain a second interference covariance matrix through measurement based on the additional DMRS symbol.

As shown in (b) in FIG. 6, when a specific offset exists between a slot of the macro site and a slot of the micro site, a position of the first symbol of the micro site overlaps only a part of a symbol position of the first symbol occupied by the PDCCH CORESET of the macro site, and a part of the symbol position of the first symbol of the micro site does not overlap the time-frequency resource occupied by the PDCCH CORESET of the macro site. Therefore, an error occurs on measurement for determining the interference covariance matrix for the PDCCH of the macro site based on the first symbol. In this case, a configuration of $l_0=32$ 1 and $l_1=3$ can ensure that the position of the front-loaded DMRS symbol and the position of the additional DMRS symbol respectively overlap the position of the time-frequency resource for the PDCCH CORESET of the macro site and the position of the time-frequency resource for the PDSCH of the macro site, to avoid the measurement error that is of the interference covariance matrix and that is caused by the slot offset.

In addition, if the micro site determines that there is the different-configuration slot (namely, the second different-configuration slot) other than the first different-configuration slot in the different-configuration slots indicated by the fourth information, the micro site may receive the DMRS in the second different-configuration slot in an existing DMRS configuration manner, and obtain the interference covariance matrix through measurement based on the DMRS symbol.

S207: The micro site performs Wiener filtering based on the interference covariance matrix to suppress neighboring cell interference.

For example, if the micro site obtains the first interference covariance matrix through measurement based on the front-loaded DMRS symbol, and obtains the second interference covariance matrix through measurement based on the additional DMRS symbol, the micro site may perform Wiener filtering based on the first interference covariance matrix and the second interference covariance matrix, to suppress the neighboring cell interference.

According to the foregoing procedure, the UE 1 may send the DMRS symbol in the first different-configuration slot based on the configuration of the micro site. Each DMRS CDM group in the DMRS symbol occupies four consecutive REs in frequency domain, so that an uplink transmission capacity can be increased. In addition, as shown in FIG. 5 and FIG. 6, the micro site may configure the UE 1 to send the front-loaded DMRS symbol and the additional DMRS symbol. The position of the time-frequency resource for the front-loaded DMRS symbol overlaps the position of the time-frequency resource occupied by the PDCCH CORESET of the macro site, and the position of the time-frequency resource occupied by the additional DMRS symbol overlaps the position of the time-frequency resource occupied by the PDSCH of the macro site. Therefore, the micro site may estimate the interference covariance matrix for the PDCCH of the macro site based on the front-loaded DMRS symbol, and estimate the interference covariance matrix for the PDSCH of the macro site based on the additional DMRS symbol, so that the micro site improves, based on the two interference covariance matrices, an effect of suppressing the neighboring cell interference caused by the macro site.

An embodiment of the present disclosure provides another communication method, to improve a neighboring cell interference suppression effect of a micro site. The method may be implemented by a first network device, a second network device, and a terminal device. As shown in FIG. 2, the first network device may include the micro site shown in FIG. 2, the second network device may include the macro site shown in FIG. 2, and the terminal device may include the UE 1 shown in FIG. 2. The first network device and the terminal device may be respectively implemented by the network device 102 and the terminal device 101 shown in FIG. 1.

Figure 7:
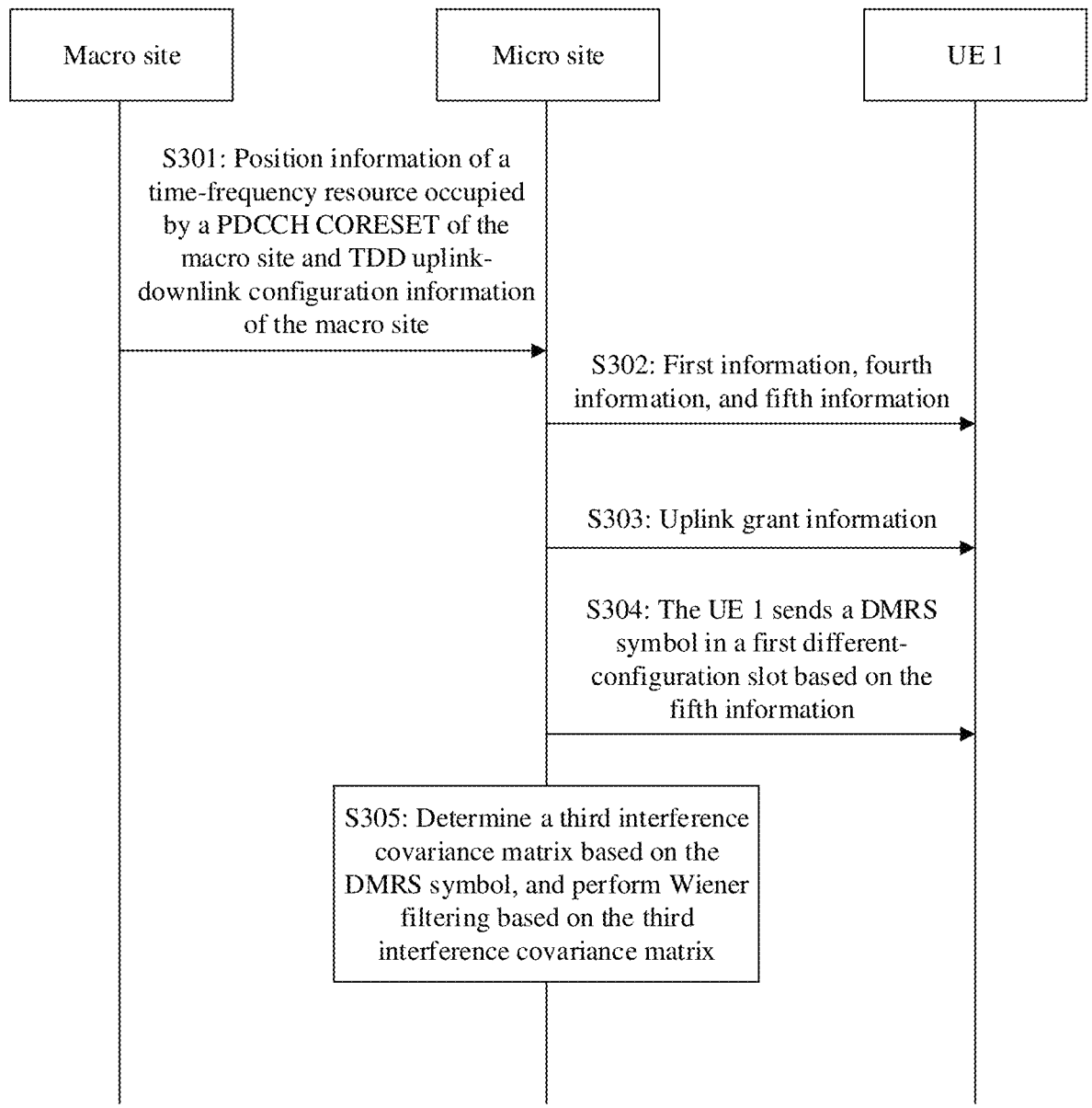
FIG. 7 is a schematic flowchart of another communication method according to an embodiment of the present disclosure.

Using the communication system shown in FIG. 2 as an example, the communication method may include the following steps shown in FIG. 7.

S301: The macro site sends, to a micro site, position information of a time-frequency resource occupied by a PDCCH CORESET of the macro site and TDD uplink-downlink configuration information of the macro site.

For an implementation of this step, refer to the implementation of S101. Details are not described herein again.

S302: The micro site sends first information, fourth information, and fifth information to the UE 1.

The first information indicates the position of the time-frequency resource occupied by the PDCCH CORESET of the macro site.

The fourth information indicates a time domain position of at least one different-configuration slot.

For a manner of determining the first information and the fourth information, refer to the manner of determining the first information and the fourth information in S102 and/or S202.

Figure 8:
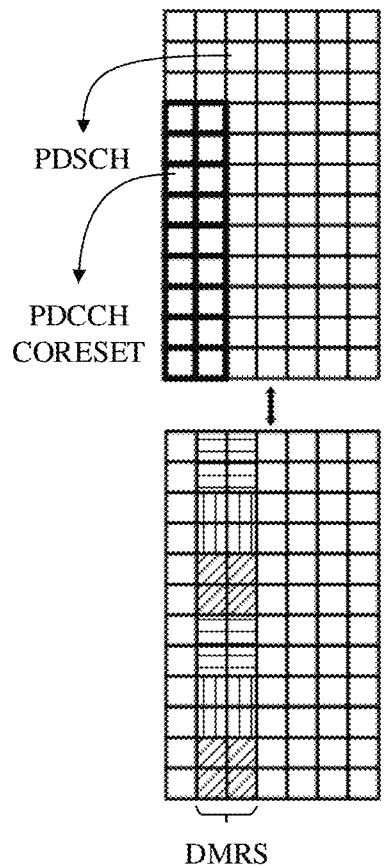
FIG. 8 is a schematic diagram of a time-frequency structure of another DMRS symbol according to an embodiment of the present disclosure.
Figure 9:
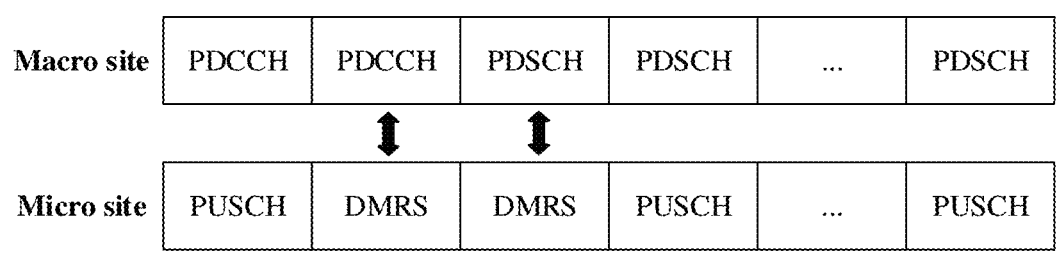
FIG. 9 is a schematic diagram of a time domain structure of another DMRS symbol according to an embodiment of the present disclosure.

The fifth information may indicate a symbol position of a front-loaded DMRS symbol in a different-configuration slot. FIG. 8 and FIG. 9 are respectively schematic diagrams of a time-frequency resource and a time domain resource in a first different-configuration slot. As shown in FIG. 8 and FIG. 9, the front-loaded DMRS symbol is a double-symbol DMRS, and overlaps the position of the time-frequency resource occupied by the PDCCH CORESET of the macro site and a position of a time-frequency resource occupied by a PDSCH of the macro site. For example, the double-symbol DMRS is aligned with a time domain position of the last symbol of the PDCCH CORESET of the macro site and a time domain position of the first symbol of the PDSCH of the macro site.

Optionally, the micro site may further send sixth information to the UE 1, where the sixth information indicates that a quantity of consecutive REs occupied by each DMRS CDM group included in the front-loaded DMRS symbol is m, where m is a positive integer.

In addition, the micro site may configure each DMRS CDM group in the DMRS symbol to occupy three or more consecutive REs, to improve an uplink data communication capacity of the UE 1. This is similar to a case in FIG. 5.

S303: The micro site sends uplink grant information to the UE 1.

The uplink grant information may indicate a position of a time-frequency resource for uplink data of the UE 1.

S304: The UE 1 sends the front-loaded DMRS symbol to the micro site in the first different-configuration slot based on the fifth information.

The first different-configuration slot is at least one of the at least one different-configuration slot indicated by the fourth information. The position of the time-frequency resource occupied by the uplink data of the UE 1 overlaps, in the first different-configuration slot, the position that is of the time-frequency resource occupied by the PDCCH CORESET of the macro site and that is indicated by the first information. For a manner of determining the first different-configuration slot, refer to the descriptions in S104 and/or S205.

S305: The micro site determines a third interference covariance matrix based on the front-loaded DMRS symbol received in the first different-configuration slot, and performs Wiener filtering based on the third interference covariance matrix.

In this design, the front-loaded DMRS symbol overlaps the position of the time-frequency resource occupied by the PDCCH CORESET of the macro site and the position of the time-frequency resource occupied by the PDSCH of the macro site. Therefore, the third interference covariance matrix obtained through measurement based on the DMRS symbol may represent an average of an interference covariance matrix for a PDCCH of the macro site and an interference covariance matrix for the PDSCH of the macro site. The micro site performs Wiener filtering based on the third interference covariance matrix, so that neighboring cell interference caused by the macro site can be suppressed to some extent. This manner leads to a small change to a design of a baseband chip, is highly implementable, and has robustness, but is limited to a level of suppressing the neighboring cell interference caused by the macro site.

In correspondence to the methods provided in the foregoing method embodiments, embodiments of the present disclosure further provide corresponding apparatuses. The apparatuses include corresponding modules configured to perform the foregoing embodiments. The module may be software, hardware, or a combination of software and hardware.

Figure 10:
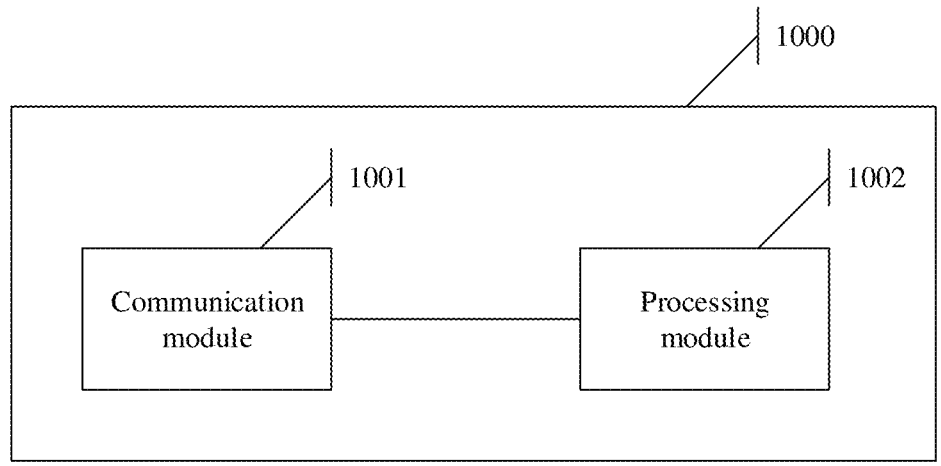
FIG. 10 is a schematic diagram of a structure of a communication apparatus according to an embodiment of the present disclosure.

FIG. 10 is a schematic diagram of a structure of a communication apparatus 1000. The communication apparatus 1000 may be a terminal device, or may be a chip, a chip system, a processor, or the like that supports the terminal device in implementing the foregoing methods. The communication apparatus 1000 may be configured to implement the methods described in the foregoing method embodiments. For details, refer to the descriptions in the foregoing method embodiments.

As shown in FIG. 10, a communication apparatus provided in an embodiment of the present disclosure may include a communication module 1001 and a processing module 1002. The communication module 1001 and the processing module 1002 are coupled to each other. The communication apparatus 1000 may be configured to perform the steps performed by the terminal device or the first network device shown in FIG. 3, FIG. 4, or FIG. 7. The communication module 1001 may be configured to support the communication apparatus 1000 in communication. The communication module 1001 may also be referred to as a communication unit, a communication interface, a transceiver module, or a transceiver unit. The communication module 1001 may have a wireless communication function, for example, can communicate with another communication apparatus in a wireless communication manner. The processing module 1002 may also be referred to as a processing unit, and may be configured to support the communication apparatus 1000 in performing processing actions performed by the first communication apparatus or the third communication apparatus in the foregoing method embodiments, where the processing actions include but are not limited to: generating information or a message to be sent by the communication module 1001, demodulating and decoding a signal received by the communication module 1001, and/or another action.

When the steps performed by the terminal device (namely, the UE 1) in the method shown in FIG. 3 or FIG. 4 in the foregoing method embodiments are performed, the communication module 1001 may receive first information, second information, third information, and fourth information from a first network device. The first information may indicate a position of a time-frequency resource occupied by a PDCCH CORESET of a second network device. The second information indicates that each DMRS CDM group included in a DMRS symbol occupies n REs consecutive in frequency domain, where n is a positive integer and is greater than 2. The third information may indicate a symbol position of the DMRS symbol in a different-configuration slot. The fourth information indicates a time domain position of at least one different-configuration slot. The first network device is located within coverage of the second network device. The communication module 1001 may further receive uplink grant information from the first network device. The uplink grant information indicates a position of a time-frequency resource for uplink data of the terminal device. The communication module 1001 may send the DMRS symbol to the first network device in a first different-configuration slot based on the second information and the third information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

In a possible design, a value of n is 4.

In a possible design, the third information may indicate a symbol position of a front-loaded DMRS symbol in the different-configuration slot, and indicate a symbol position of an additional DMRS symbol in the different-configuration slot. The symbol position of the front-loaded DMRS symbol is an $m^{th}$ symbol occupied by the PDCCH CORESET of the second network device in the different-configuration slot, and the symbol position of the additional DMRS symbol is an $m^{th}$ symbol occupied by a PDSCH of the second network device in the different-configuration slot, where m is 1 or 2.

In a possible design, the first network device is a micro site accessed by the terminal device, and the second network device is a macro site.

When the steps performed by the first network device (namely, the micro site) in the method shown in FIG. 3 or FIG. 4 in the foregoing method embodiments are performed, the communication module 1001 may send first information, second information, third information, and fourth information to a terminal device. The first information may indicate a position of a time-frequency resource occupied by a PDCCH CORESET of a second network device. The second information indicates that each DMRS CDM group included in a DMRS symbol occupies n REs consecutive in frequency domain, where n is a positive integer and is greater than 2. The third information may indicate a symbol position of the DMRS symbol in a different-configuration slot. The fourth information indicates a time domain position of at least one different-configuration slot. The first network device is located within coverage of the second network device. The communication module 1001 may further send uplink grant information to the terminal device, where the uplink grant information indicates a position of a time-frequency resource for uplink data of the terminal device. The communication module 1001 may further receive the DMRS symbol from the terminal device in a first different-configuration slot based on the second information and the third information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET of the second network device.

In addition, the communication module 1001 may further receive the first information from the second network device.

In a possible design, a value of n is 4.

In a possible design, the third information may indicate a symbol position of a front-loaded DMRS symbol in the different-configuration slot, and indicate a symbol position of an additional DMRS symbol in the different-configuration slot. The symbol position of the front-loaded DMRS symbol is an $m^{th}$ symbol occupied by the PDCCH CORESET of the second network device in the different-configuration slot, and the symbol position of the additional DMRS symbol is an $m^{th}$ symbol occupied by a PDSCH of the second network device in the different-configuration slot, where m is 1 or 2.

In a possible design, the processing module 1002 may determine a first interference covariance matrix based on a first DMRS symbol, and determine a second interference covariance matrix based on a second DMRS symbol. The first network device may perform Wiener filtering based on the first interference covariance matrix and the second interference covariance matrix.

In a possible design, the first network device is a micro site accessed by the terminal device, and the second network device is a macro site.

When the steps performed by the terminal device in the method shown in FIG. 7 in the foregoing method embodiments are performed, the communication module 1001 may receive first information, fourth information, and fifth information from a first network device. The first information indicates a position of a time-frequency resource occupied by a PDCCH CORESET of a second network device. The fifth information indicates a symbol position of a front-loaded DMRS symbol, a length of the front-loaded DMRS symbol is 2, and a time domain position of the front-loaded DMRS symbol overlaps a last symbol occupied by the PDCCH CORESET in a different-configuration slot, and overlaps the first symbol occupied by a PDSCH of the second network device. The fourth information indicates a time domain position of at least one different-configuration slot. The first network device is located within coverage of the second network device. The communication module 1001 may further receive uplink grant information from the first network device, where the uplink grant information indicates a position of a time-frequency resource for uplink data of the terminal device. The communication module 1001 may send the front-loaded DMRS symbol to the first network device in a first different-configuration slot based on the fifth information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

In a possible design, the first network device is a micro site accessed by the terminal device, and the second network device is a macro site.

When the steps performed by the first network device in the method shown in FIG. 7 in the foregoing method embodiments are performed, the communication module 1001 may send first information, fourth information, and fifth information to a terminal device. The first information indicates a position of a time-frequency resource occupied by a PDCCH CORESET of a second network device. The fifth information indicates a symbol position of a front-loaded DMRS symbol, a length of the front-loaded DMRS symbol is 2, and a time domain position of the front-loaded DMRS symbol overlaps a last symbol occupied by the PDCCH CORESET in a different-configuration slot, and overlaps the first symbol occupied by a PDSCH of the second network device. The fourth information indicates a time domain position of at least one different-configuration slot. The first network device is located within coverage of the second network device. The terminal device may further receive uplink grant information from the first network device, where the uplink grant information indicates a position of a time-frequency resource for uplink data of the terminal device. The communication module 1001 may further send the uplink grant information to the terminal device, where the uplink grant information indicates the position of the time-frequency resource for the uplink data of the terminal device. The communication module 1001 may further receive the front-loaded DMRS symbol from the terminal device in a first different-configuration slot based on the fifth information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

In a possible design, the processing module 1002 may determine a third interference covariance matrix based on the front-loaded DMRS symbol, and perform Wiener filtering based on the third interference covariance matrix.

In a possible design, the first network device is a micro site accessed by the terminal device, and the second network device is a macro site.

Figure 11:
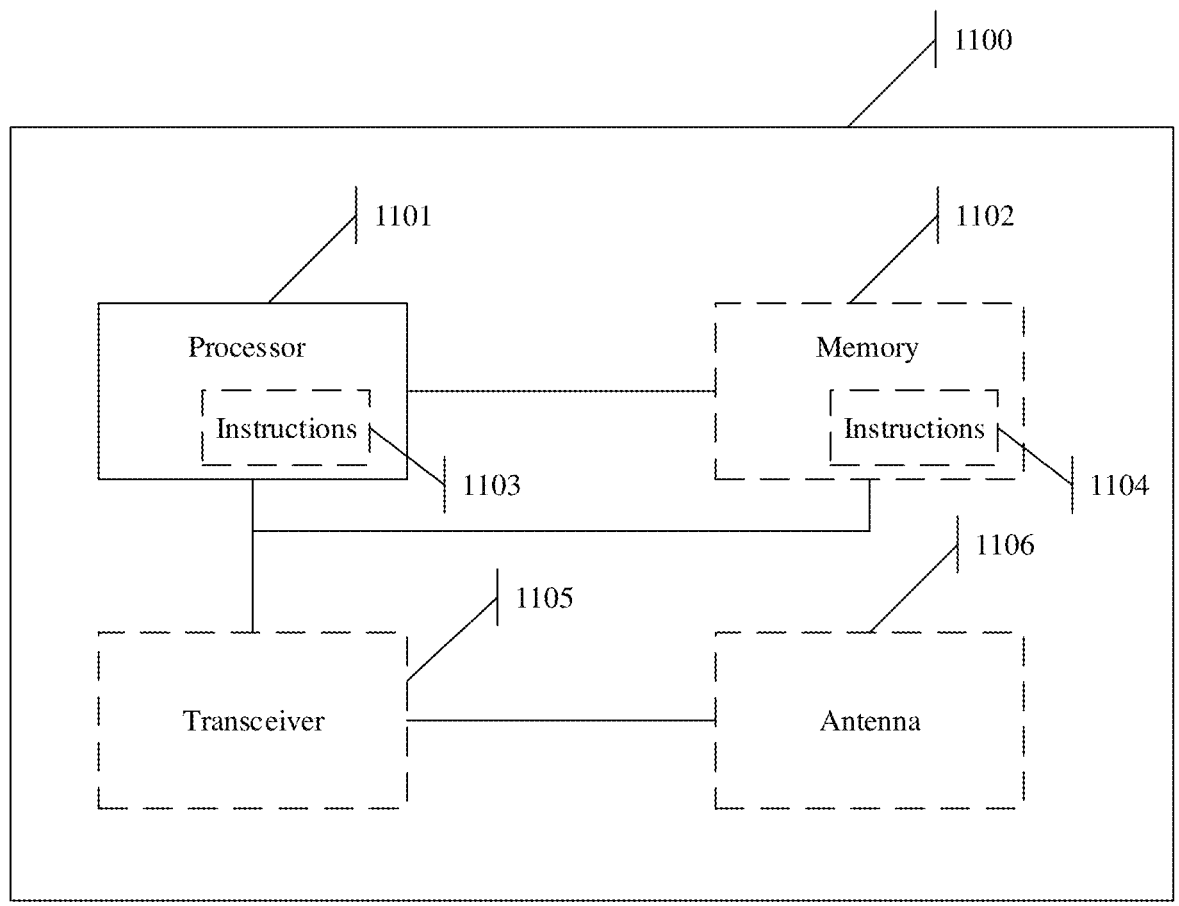
FIG. 11 is a schematic diagram of a structure of another communication apparatus according to an embodiment of the present disclosure.

FIG. 11 is a schematic diagram of a structure of another communication apparatus according to an embodiment of the present disclosure. The communication apparatus may be implemented by a hardware component. The apparatus 1100 shown in FIG. 11 may be a first communication apparatus, or may be a chip, a chip system, a processor, or the like that supports the first communication apparatus in implementing the foregoing methods. Alternatively, the apparatus 1100 may be a third communication apparatus, or may be a chip, a chip system, a processor, or the like that supports the third communication apparatus in implementing the foregoing methods. The apparatus 1100 may be configured to implement the method performed by the first communication apparatus or the third communication apparatus described in the foregoing method embodiments. For details, refer to the descriptions in the foregoing method embodiments. The apparatus 1100 has a function of implementing the first communication apparatus or the third communication apparatus described in embodiments of the present disclosure. For example, the apparatus 1100 includes corresponding modules, units, or means used by the first communication apparatus or the third communication apparatus to perform the steps performed by the terminal in embodiments of the present disclosure. The functions, units, or means may be implemented by software, may be implemented by hardware, may be implemented by hardware executing corresponding software, or may be implemented by a combination of software and hardware. For details, refer to the corresponding descriptions in the foregoing corresponding method embodiments.

The apparatus 1100 may include one or more processors 1101. The processor 1101 may also be referred to as a processing unit, and may implement a specific control function. The processor 1101 may be a general-purpose processor, a special-purpose processor, or the like. For example, the processor 1101 may be a baseband processor or a central processing unit. The baseband processor may be configured to process a communication protocol and communication data. The central processing unit may be configured to: control the communication apparatus (for example, a base station, a baseband chip, a terminal, a terminal chip, a distributed unit (DU), or a central unit (CU)), execute a software program, and process data of the software program.

In an optional design, the processor 1101 may store instructions 1103 and/or data, and the instructions 1103 and/or the data may be run by the processor, so that the apparatus 1100 performs the methods described in the foregoing method embodiments.

In another optional design, the processor 1101 may include a transceiver unit configured to implement receiving and sending functions. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, the apparatus 1100 may include a circuit. The circuit may implement the sending, receiving, or communication function in the foregoing method embodiments.

Optionally, the apparatus 1100 may include one or more memories 1102. The memory stores instructions 1104, and the instructions may be run on the processor, so that the apparatus 1100 performs the methods described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor. The processor 1101 and/or the memory 1102 may be considered as the processing module 1002 shown in FIG. 10.

Optionally, the apparatus 1100 may further include a transceiver 1105 and/or an antenna 1106. The processor 1101 may be referred to as a processing unit, and control the apparatus 1100. The transceiver 1105 may be referred to as a transceiver unit, a transceiver circuit, a transceiver apparatus, a transceiver module, or the like, and is configured to implement a transceiver function. The transceiver 1105 and/or the antenna 1106 may be considered as the communication module 1001 shown in FIG. 10.

Optionally, the apparatus 1100 in this embodiment of the present disclosure may be configured to perform the methods described in the foregoing embodiments of the present disclosure. The processor 1101 may be configured to implement the processing module 1002 shown in FIG. 10, and the transceiver 1105 may be configured to implement the communication module 1001 shown in FIG. 10.

When the steps performed by the terminal device (namely, the UE 1) in the method shown in FIG. 3 or FIG. 4 in the foregoing method embodiments are performed, the transceiver 1105 may receive first information, second information, third information, and fourth information from a first network device. The first information may indicate a position of a time-frequency resource occupied by a PDCCH CORESET of a second network device. The second information indicates that each DMRS CDM group included in a DMRS symbol occupies n REs consecutive in frequency domain, where n is a positive integer and is greater than 2. The third information may indicate a symbol position of the DMRS symbol in a different-configuration slot. The fourth information indicates a time domain position of at least one different-configuration slot. The first network device is located within coverage of the second network device. The transceiver 1105 may further receive uplink grant information from the first network device. The uplink grant information indicates a position of a time-frequency resource for uplink data of the terminal device. The transceiver 1105 may send the DMRS symbol to the first network device in a first different-configuration slot based on the second information and the third information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

In a possible design, a value of n is 4.

In a possible design, the third information may indicate a symbol position of a front-loaded DMRS symbol in the different-configuration slot, and indicate a symbol position of an additional DMRS symbol in the different-configuration slot. The symbol position of the front-loaded DMRS symbol is an $m^{th}$ symbol occupied by the PDCCH CORESET of the second network device in the different-configuration slot, and the symbol position of the additional DMRS symbol is an $m^{th}$ symbol occupied by a PDSCH of the second network device in the different-configuration slot, where m is 1 or 2.

In a possible design, the first network device is a micro site accessed by the terminal device, and the second network device is a macro site.

When the steps performed by the first network device (namely, the micro site) in the method shown in FIG. 3 or FIG. 4 in the foregoing method embodiments are performed, the transceiver 1105 may send first information, second information, third information, and fourth information to a terminal device. The first information may indicate a position of a time-frequency resource occupied by a PDCCH CORESET of a second network device. The second information indicates that each DMRS CDM group included in a DMRS symbol occupies n REs consecutive in frequency domain, where n is a positive integer and is greater than 2. The third information may indicate a symbol position of the DMRS symbol in a different-configuration slot. The fourth information indicates a time domain position of at least one different-configuration slot. The first network device is located within coverage of the second network device. The transceiver 1105 may further send uplink grant information to the terminal device, where the uplink grant information indicates a position of a time-frequency resource for uplink data of the terminal device. The transceiver 1105 may further receive the DMRS symbol from the terminal device in a first different-configuration slot based on the second information and the third information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET of the second network device.

In addition, the transceiver 1105 may further receive the first information from the second network device.

In a possible design, a value of n is 4.

In a possible design, the third information may indicate a symbol position of a front-loaded DMRS symbol in the different-configuration slot, and indicate a symbol position of an additional DMRS symbol in the different-configuration slot. The symbol position of the front-loaded DMRS symbol is an $m^{th}$ symbol occupied by the PDCCH CORESET of the second network device in the different-configuration slot, and the symbol position of the additional DMRS symbol is an $m^{th}$ symbol occupied by a PDSCH of the second network device in the different-configuration slot, where m is 1 or 2.

In a possible design, the processor 1101 may determine a first interference covariance matrix based on a first DMRS symbol, and determine a second interference covariance matrix based on a second DMRS symbol. The first network device may perform Wiener filtering based on the first interference covariance matrix and the second interference covariance matrix.

In a possible design, the first network device is a micro site accessed by the terminal device, and the second network device is a macro site.

When the steps performed by the terminal device in the method shown in FIG. 7 in the foregoing method embodiments are performed, the transceiver 1105 may receive first information, fourth information, and fifth information from a first network device. The first information indicates a position of a time-frequency resource occupied by a PDCCH CORESET of a second network device. The fifth information indicates a symbol position of a front-loaded DMRS symbol, a length of the front-loaded DMRS symbol is 2, and a time domain position of the front-loaded DMRS symbol overlaps a last symbol occupied by the PDCCH CORESET in a different-configuration slot, and overlaps the first symbol occupied by a PDSCH of the second network device. The fourth information indicates a time domain position of at least one different-configuration slot. The first network device is located within coverage of the second network device. The transceiver 1105 may further receive uplink grant information from the first network device, where the uplink grant information indicates a position of a time-frequency resource for uplink data of the terminal device. The transceiver 1105 may send the front-loaded DMRS symbol to the first network device in a first different-configuration slot based on the fifth information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

In a possible design, the first network device is a micro site accessed by the terminal device, and the second network device is a macro site.

When the steps performed by the first network device in the method shown in FIG. 7 in the foregoing method embodiments are performed, the transceiver 1105 may send first information, fourth information, and fifth information to a terminal device. The first information indicates a position of a time-frequency resource occupied by a PDCCH CORESET of a second network device. The fifth information indicates a symbol position of a front-loaded DMRS symbol, a length of the front-loaded DMRS symbol is 2, and a time domain position of the front-loaded DMRS symbol overlaps a last symbol occupied by the PDCCH CORESET in a different-configuration slot, and overlaps the first symbol occupied by a PDSCH of the second network device. The fourth information indicates a time domain position of at least one different-configuration slot. The first network device is located within coverage of the second network device. The terminal device may further receive uplink grant information from the first network device, where the uplink grant information indicates a position of a time-frequency resource for uplink data of the terminal device. The transceiver 1105 may further send the uplink grant information to the terminal device, where the uplink grant information indicates the position of the time-frequency resource for the uplink data of the terminal device. The transceiver 1105 may further receive the front-loaded DMRS symbol from the terminal device in a first different-configuration slot based on the fifth information. The first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

In a possible design, the processor 1101 may determine a third interference covariance matrix based on the front-loaded DMRS symbol, and perform Wiener filtering based on the third interference covariance matrix.

In a possible design, the first network device is a micro site accessed by the terminal device, and the second network device is a macro site.

The processor and the transceiver that are described in the present disclosure may be implemented on an integrated circuit (IC), an analog IC, a radio frequency integrated circuit RFIC, a mixed signal IC, an application-specific integrated circuit (ASIC), a printed circuit board (PCB), an electronic device, or the like. The processor and the transceiver may be manufactured by using various IC processing technologies, for example, a complementary metal oxide semiconductor (CMOS), an n-type metal oxide semiconductor (NMOS), a p-channel metal oxide semiconductor (PMOS), a bipolar junction transistor (BJT), a bipolar CMOS (BiCMOS), silicon germanium (SiGe), and gallium arsenide (GaAs).

The apparatus described in the foregoing embodiments may be the terminal device. However, a scope of the apparatus described in the present disclosure is not limited thereto, and a structure of the apparatus may not be limited to the structure in FIG. 11. The apparatus may be an independent device, or may be a part of a large device. For example, the apparatus may be:

(1) an independent integrated circuit IC, a chip, or a chip system or subsystem:
(2) a set of one or more ICs, where optionally, the IC set may also include a storage component configured to store data and/or instructions:
(3) an ASIC, for example, a modem (MSM):
(4) a module that can be embedded in another device:
(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like: or
(6) others.

It should be understood that the components included in the communication apparatus in the foregoing embodiments are illustrative, and are merely a possible example. In an actual implementation, the components may be composed in another manner. In addition, the components in the foregoing communication apparatus may be integrated into one module, or may exist alone physically. The foregoing integrated module may be implemented in a form of hardware, or may be implemented in a form of a software function module. It should not be understood that the structure shown in the foregoing accompanying drawings is limited.

Based on a same concept as the foregoing method embodiments, an embodiment of the present disclosure further provides a computer-readable storage medium. The computer-readable storage medium stores a computer program. When the program is executed by a processor, a computer is enabled to perform an operation performed by the first communication apparatus or the third communication apparatus in any one of the foregoing method embodiments or the possible implementations of the foregoing method embodiments.

Based on a same concept as the foregoing method embodiments, the present disclosure further provides a computer program product. When the computer program product is invoked and executed by a computer, the computer is enabled to implement an operation performed by the first communication apparatus or the third communication apparatus in any one of the foregoing method embodiments or the possible implementations of the foregoing method embodiments.

Based on a same concept as the foregoing method embodiments, the present disclosure further provides a chip or a chip system. The chip may include a processor. The chip may further include a memory (or a storage module) and/or a transceiver (or a communication module); or the chip is coupled to a memory (or a storage module) and/or a transceiver (or a communication module). The transceiver (or the communication module) may be configured to support the chip in performing wired and/or wireless communication. The memory (or the storage module) may be configured to store a program. The processor invokes the program to implement an operation performed by the first communication apparatus or the third communication apparatus in any one of the foregoing method embodiments or the possible implementations of the foregoing method embodiments. The chip system may include the chip, or may include the chip and another discrete component, for example, a memory (or a storage module) and/or a transceiver (or a communication module).

It should be understood that the memory in the present disclosure may be configured to store at least a computer program or instructions, and/or store information and data in embodiments of the present disclosure. The computer program may be invoked by the processor (or the processing unit or the processing module), to perform the methods in embodiments of the present disclosure. The memory may be a flash memory, a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that is accessible to a computer, but is not limited thereto. The memory may independently exist and may be connected to the processor through a communication bus. The memory may alternatively be integrated with the processor.

Based on a same concept as the foregoing method embodiments, the present disclosure further provides a communication system. The communication system may be configured to implement an operation performed by the first communication apparatus or the third communication apparatus in any one of the foregoing method embodiments or the possible implementations of the foregoing method embodiments. For example, the communication system has a structure shown in FIG. 1 or FIG. 2.

Embodiments of the present disclosure are described with reference to the flowcharts and/or block diagrams of the methods, the apparatuses, and the computer program product in embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

What is claimed is:

1. A communication method, comprising:

receiving first information, second information, third information, and fourth information from a first network device, wherein the first information indicates a position of a time-frequency resource occupied by a physical downlink control channel (PDCCH) control resource set (CORESET) of a second network device; the second information indicates that each demodulation reference signal (DMRS) code division multiplexing (CDM) group comprised in a DMRS symbol occupies n resource elements (REs) consecutive in frequency domain, wherein n is a positive integer and is greater than 2; the third information indicates a symbol position of the DMRS symbol in a different-configuration slot; the fourth information indicates one or more time domain positions of at least one different-configuration slot; and the first network device is located within coverage of the second network device;

receiving uplink grant information from the first network device, wherein the uplink grant information indicates a position of a time-frequency resource for uplink data of a terminal device; and sending the DMRS symbol to the first network device in a first different-configuration slot based on the second information and the third information, wherein the first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

2. The communication method according to claim 1, wherein a value of n is 4.

3. The communication method according to claim 1, wherein the third information indicates a symbol position of a front-loaded DMRS symbol in the different-configuration slot and a symbol position of an additional DMRS symbol in the different-configuration slot, the symbol position of the front-loaded DMRS symbol is an $m^{th}$ symbol occupied by the PDCCH CORESET of the second network device in the different-configuration slot, and the symbol position of the additional DMRS symbol is an $m^{th}$ symbol occupied by a PDSCH of the second network device in the different-configuration slot, wherein m is 1 or 2.

4. The communication method according to claim 1, wherein the first network device is a micro site accessed by the terminal device, and the second network device is a macro site.

5. The communication method according to claim 1, wherein each of the at least one different-configuration slot is a slot that serves as a downlink slot for the second network device and serves as an uplink slot for the first network device.

6. A communication method applied in a first network device, comprising:
sending first information, second information, third information, and fourth information to a terminal device, wherein the first information indicates a position of a time-frequency resource occupied by a physical downlink control channel (PDCCH) control resource set (CORESET) of a second network device; the second information indicates that each demodulation reference signal (DMRS) e division multiplexing (CDM) group comprised in a DMRS symbol occupies n resource elements (REs) consecutive in frequency domain, wherein n is a positive integer and is greater than 2; the third information indicates a symbol position of the DMRS symbol in a different-configuration slot; the fourth information indicates a-one or more time domain positions of at least one different-configuration slot; and the first network device is located within coverage of the second network device;
sending uplink grant information to the terminal device, wherein the uplink grant information indicates a position of a time-frequency resource for uplink data of the terminal device; and
receiving the DMRS symbol from the terminal device in a first different-configuration slot based on the second information and the third information, wherein the first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

7. The communication method according to claim 6, wherein a value of n is 4.

8. The communication method according to claim 6, wherein the third information indicates a symbol
position of a front-loaded DMRS symbol in the different-configuration slot and a symbol position of an additional DMRS symbol in the different-configuration slot, the symbol position of the front-loaded DMRS symbol is an $m^{th}$ symbol occupied by the PDCCH CORESET of the second network device in the different-configuration slot, and the symbol position of the additional DMRS symbol is an $m^{th}$ symbol occupied by a PDSCH of the second network device in the different-configuration slot, wherein m is 1 or 2; and
the communication method further comprises:
determining a first interference covariance matrix based on the front-loaded DMRS symbol, and determining a second interference covariance matrix based on the additional DMRS symbol; and
performing Wiener filtering based on the first interference covariance matrix and the second interference covariance matrix.

9. The method according to claim 6, wherein the first network device is a micro site accessed by the terminal device, and the second network device is a macro site.

10. The communication method according to claim 6, wherein each of the at least one different-configuration slot is a slot that serves as a downlink slot for the second network device and serves as an uplink slot for the first network device.

11. A communication apparatus, comprising:
at least one processor; and
a memory storing programming instructions that, when executed by the at least one processor, cause the communication apparatus to perform operations comprising:
receiving first information, second information, third information, and fourth information from a first network device, wherein the first information indicates a position of a time-frequency resource occupied by a physical downlink control channel (PDCCH) control resource set (CORESET) of a second network device; the second information indicates that each demodulation reference signal (DMRS) code division multiplexing (CDM) group comprised in a DMRS symbol occupies n resource elements (REs) consecutive in frequency domain, wherein n is a positive integer and is greater than 2; the third information indicates a symbol position of the DMRS symbol in a different-configuration slot; the fourth information indicates one or more time domain positions of at least one different-configuration slot; and the first network device is located within coverage of the second network device;
receiving uplink grant information from the first network device, wherein the uplink grant information indicates a position of a time-frequency resource for uplink data of a terminal device; and
sending the DMRS symbol to the first network device in a first different-configuration slot based on the second information and the third information, wherein the first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

12. The communication apparatus according to claim 11, wherein a value of n is 4.

13. The communication apparatus according to claim 11, wherein the third information indicates a symbol position of a front-loaded DMRS symbol in the different-configuration slot and a symbol position of an additional DMRS symbol in the different-configuration slot, the symbol position of the front-loaded DMRS symbol is an $m^{th}$ symbol occupied by the PDCCH CORESET of the second network device in the different-configuration slot, and the symbol position of the additional DMRS symbol is an $m^{th}$ symbol occupied by a PDSCH of the second network device in the different-configuration slot, wherein m is 1 or 2.

14. The communication apparatus according to claim 11, wherein the first network device is a micro site accessed by the terminal device, and the second network device is a macro site.

15. The communication apparatus according to claim 11, wherein each of the at least one different-configuration slot is a slot that serves as a downlink slot for the second network device and serves as an uplink slot for the first network device.

16. A communication apparatus, comprising:
at least one processor; and
a memory storing programming instructions that, when executed by the at least one processor, cause the communication apparatus to perform operations comprising:
sending first information, second information, third information, and fourth information to a terminal device, wherein the first information indicates a position of a time-frequency resource occupied by a physical downlink control channel (PDCCH) control resource set (CORESET) of a second network device; the second information indicates that each der erence signal (DMRS) code division aduplexing (CDM) group comprised in a DMRS symbol occupies n resource elements (REs) consecutive in frequency domain, wherein n is a positive integer and is greater than 2; the third information indicates a symbol position of the DMRS symbol in a different-configuration slot; the fourth information indicates a one or more time domain positions of at least one different-configuration slot; and the communication apparatus is located within coverage of the second network device;
sending uplink grant information to the terminal device, wherein the uplink grant information indicates a position of a time-frequency resource for uplink data of the terminal device; and
receiving the DMRS symbol from the terminal device in a first different-configuration slot based on the second information and the third information, wherein the first different-configuration slot is at least one of the at least one different-configuration slot, and the position of the time-frequency resource occupied by the uplink data of the terminal device overlaps, in the first different-configuration slot, the position of the time-frequency resource occupied by the PDCCH CORESET.

17. The communication apparatus according to claim 16, wherein a value of n is 4.

18. The communication apparatus according to claim 16, wherein the third information indicates a symbol position of a front-loaded DMRS symbol in the different-configuration slot and a symbol position of an additional DMRS symbol in the different-configuration slot, the symbol position of the front-loaded DMRS symbol is an $m^{th}$ symbol occupied by the PDCCH CORESET of the second network device in the different-configuration slot, and the symbol position of the additional DMRS symbol is an $m^{th}$ symbol occupied by a PDSCH of the second network device in the different-configuration slot, wherein m is 1 or 2; and
the operations further comprise:
determining a first interference covariance matrix based on the front-loaded DMRS symbol, and determining a second interference covariance matrix based on the additional DMRS symbol; and
performing Wiener filtering based on the first interference covariance matrix and the second interference covariance matrix.

19. The communication apparatus according to claim 16, wherein the communication apparatus is a micro site accessed by the terminal device, and the second network device is a macro site.

20. The communication apparatus according to claim 16, wherein each of the at least one different-configuration slot is a slot that serves as a downlink slot for the second network device and serves as an uplink slot for the communication apparatus.

\* \* \* \* \*

UNITED STATES PATENT AND TRADEMARK OFFICE
CERTIFICATE OF CORRECTION

PATENT NO. : 12,413,365 B2  
APPLICATION NO. : 18/167161  
DATED : September 9, 2025  
INVENTOR(S) : Weilin Qu Page 1 of 1

It is certified that error appears in the above-identified patent and that said Letters Patent is hereby corrected as shown below:

In the Specification

Column 4, Line 54, change "overlaps 5" to be --overlaps--;

Column 18, Line 30, change "$102." to --S102.--;

In the Claims

Column 35, Claim 6, Line 33, change "e division." to --code division.--;

Column 37, Claim 16, Line 22, change "der erence." to --demodulation reference.--; and Column 37, Claim 16, Line 23, change "aduplexing." to --multiplexing reference.--.

Signed and Sealed this  
Ninth Day of December, 2025

John A. Squires  
*Director of the United States Patent and Trademark Office*